US00RE46060E

(19) United States
(12) Reissued Patent
Perlmutter

(10) Patent Number: US RE46,060 E
(45) Date of Reissued Patent: Jul. 5, 2016

(54) IN-BAND SIGNALING FOR ROUTING

(71) Applicant: Genesys Telcommunications Laboratories, Inc., Daly City, CA (US)

(72) Inventor: S. Michael Perlmutter, San Francisco, CA (US)

(73) Assignee: GENESYS TELECOMMUNICATIONS LABORATORIES, INC., Daly City, CA (US)

(21) Appl. No.: 14/565,297

(22) Filed: Dec. 9, 2014

Related U.S. Patent Documents

Reissue of:
(64) Patent No.: 6,470,080
Issued: Oct. 22, 2002
Appl. No.: 09/626,779
Filed: Jul. 27, 2000

U.S. Applications:
(62) Division of application No. 08/972,772, filed on Nov. 18, 1997, now Pat. No. 6,104,802.

(51) Int. Cl.
*H04Q 3/64* (2006.01)
*H04Q 3/00* (2006.01)
(Continued)

(52) U.S. Cl.
CPC ..... *H04L 67/306* (2013.01); *H04L 65/4007* (2013.01); *H04M 3/51* (2013.01);
(Continued)

(58) Field of Classification Search
CPC ... H04L 67/306; H04L 65/4007; H04M 3/51; H04M 3/5183; H04M 3/5191; H04M 3/523; H04M 3/5237; H04M 7/006; H04M 3/42042; H04M 3/42102; H04M 3/42323; H04M 3/5166; H04M 3/5233; H04M 3/56; H04M 3/58; H04M 7/12; H04M 2203/551; H04M 2207/12; H04M 2242/22; H04M 3/42059; H04Q 3/0029; H04Q 3/0045; H04Q 3/64; H04Q 3/66; H04Q 3/72; H04Q 2213/13034; H04Q 2213/13072; H04Q 2213/13093; H04Q 2213/13103; H04Q 2213/13106; H04Q 2213/13141; H04Q 2213/13164; H04Q 2213/13174; H04Q 2213/13204; H04Q 2213/1322; H04Q 2213/13345
USPC ..... 379/219, 220.01, 229, 265.02
See application file for complete search history.

(56) References Cited

U.S. PATENT DOCUMENTS 3,914,559 A 10/1975 Knollman
4,048,452 A 9/1977 Oehring et al.
(Continued)

FOREIGN PATENT DOCUMENTS

AT 1718600 5/2000
AT 270486 7/2004
(Continued)

OTHER PUBLICATIONS

"Competitive Gateway Product," Nikkei Communications, Japan, No. 257, Nov. 1997, 18 pages.
(Continued)

*Primary Examiner* — Ovidio Escalante
(74) *Attorney, Agent, or Firm* — Lewis Roca Rothgerber Christie LLP

(57) ABSTRACT

Telephone call routing in networks is provided by forwarding routing data other than origination identification and destination identification in-band with calls, and using the in-band data at call destinations to do further routing. In some embodiments negotiation is accomplished between routers at different points in the network based on the in-band routing data. Practice of the invention extends to intelligent telephony networks and as well to simulated telephone calls between computers in wide area data networks, such as the Internet and Intranets.

10 Claims, 2 Drawing Sheets

(51) Int. Cl.

| | |
|---|---|
| ***H04M 3/50*** | (2006.01) |
| ***H04M 3/51*** | (2006.01) |
| ***H04Q 3/66*** | (2006.01) |
| ***H04M 7/00*** | (2006.01) |
| ***H04M 3/523*** | (2006.01) |
| ***H04Q 3/72*** | (2006.01) |
| ***H04M 3/56*** | (2006.01) |
| ***H04M 7/12*** | (2006.01) |
| ***H04M 3/42*** | (2006.01) |
| ***H04M 3/58*** | (2006.01) |
| ***H04L 29/08*** | (2006.01) |
| ***H04L 29/06*** | (2006.01) |

(52) U.S. Cl.

CPC ..... *H04M 3/5183* (2013.01); *H04M 3/5191* (2013.01); *H04M 3/523* (2013.01); *H04M 3/5237* (2013.01); *H04M 7/006* (2013.01); *H04Q 3/0029* (2013.01); *H04Q 3/0045* (2013.01); *H04Q 3/64* (2013.01); *H04Q 3/66* (2013.01); *H04M 3/42042* (2013.01); *H04M 3/42059* (2013.01); *H04M 3/42102* (2013.01); *H04M 3/42323* (2013.01); *H04M 3/5166* (2013.01); *H04M 3/5233* (2013.01); *H04M 3/56* (2013.01); *H04M 3/58* (2013.01); *H04M 7/12* (2013.01); *H04M 2203/551* (2013.01); *H04M 2207/12* (2013.01); *H04M 2242/22* (2013.01); *H04Q 3/72* (2013.01); *H04Q 2213/1322* (2013.01); *H04Q 2213/13034* (2013.01); *H04Q 2213/13072* (2013.01); *H04Q 2213/13093* (2013.01); *H04Q 2213/13103* (2013.01); *H04Q 2213/13106* (2013.01); *H04Q 2213/13141* (2013.01); *H04Q 2213/13164* (2013.01); *H04Q 2213/13174* (2013.01); *H04Q 2213/13204* (2013.01); *H04Q 2213/13345* (2013.01); *H04Q 2213/13349* (2013.01); *H04Q 2213/13389* (2013.01)

(56) References Cited

U.S. PATENT DOCUMENTS

| | | | | |
|---|---|---|---|---|
| 4,056,683 | A | | 11/1977 | Suehiro |
| 4,290,141 | A | | 9/1981 | Anderson et al. |
| 4,320,256 | A | | 3/1982 | Freeman |
| 4,345,315 | A | | 8/1982 | Cadotte et al. |
| 4,355,207 | A | | 10/1982 | Curtin |
| 4,355,372 | A | | 10/1982 | Johnson et al. |
| 4,400,587 | A | | 8/1983 | Taylor et al. |
| 4,439,636 | A | | 3/1984 | Newkirk et al. |
| 4,451,700 | A | | 5/1984 | Kempner et al. |
| 4,489,438 | A | | 12/1984 | Hughes |
| 4,512,011 | A | | 4/1985 | Turner |
| 4,517,410 | A | | 5/1985 | Williams et al. |
| 4,521,643 | A | | 6/1985 | Dupuis et al. |
| 4,523,055 | A | | 6/1985 | Hohl et al. |
| 4,528,643 | A | | 7/1985 | Freeny, Jr. |
| 4,539,435 | A | | 9/1985 | Eckmann |
| 4,555,903 | A | | 12/1985 | Heaton |
| 4,558,180 | A | | 12/1985 | Scordo |
| 4,559,415 | A | | 12/1985 | Bernard et al. |
| 4,566,030 | A | | 1/1986 | Nickerson et al. |
| 4,567,323 | A | | 1/1986 | Lottes et al. |
| 4,577,062 | A | | 3/1986 | Hilleary et al. |
| 4,577,067 | A | | 3/1986 | Levy et al. |
| 4,578,700 | A | | 3/1986 | Roberts et al. |
| 4,580,012 | A | | 4/1986 | Matthews et al. |
| 4,584,602 | A | | 4/1986 | Nakagawa |
| 4,587,379 | A | | 5/1986 | Masuda |
| 4,598,367 | A | | 7/1986 | DeFrancesco et al. |
| 4,603,232 | A | | 7/1986 | Kurland et al. |
| 4,611,094 | A | | 9/1986 | Asmuth et al. |
| 4,625,276 | A | | 11/1986 | Benton et al. |
| 4,630,200 | A | | 12/1986 | Ohmae et al. |
| 4,630,201 | A | | 12/1986 | White |
| 4,634,809 | A | | 1/1987 | Paulsson et al. |
| 4,649,563 | A | | 3/1987 | Riskin |
| 4,654,482 | A | | 3/1987 | DeAngelis |
| 4,667,287 | A | | 5/1987 | Allen et al. |
| 4,674,044 | A | | 6/1987 | Kalmus et al. |
| 4,679,189 | A | | 7/1987 | Olson et al. |
| 4,696,029 | A | | 9/1987 | Cohen |
| 4,697,282 | A | | 9/1987 | Winter et al. |
| 4,737,983 | A | | 4/1988 | Frauenthal et al. |
| 4,756,020 | A | | 7/1988 | Fodale |
| 4,757,267 | A | | 7/1988 | Riskin |
| 4,763,191 | A | | 8/1988 | Gordon et al. |
| 4,763,317 | A | | 8/1988 | Lehman et al. |
| 4,763,353 | A | | 8/1988 | Canale et al. |
| 4,771,425 | A | | 9/1988 | Baran et al. |
| 4,785,408 | A | | 11/1988 | Britton et al. |
| 4,788,715 | A | | 11/1988 | Lee |
| 4,811,382 | A | | 3/1989 | Sleevi |
| 4,812,843 | A | | 3/1989 | Champion, III et al. |
| 4,829,563 | A | | 5/1989 | Crockett et al. |
| 4,831,518 | A | | 5/1989 | Yu et al. |
| 4,852,001 | A | | 7/1989 | Tsushima et al. |
| 4,866,756 | A | | 9/1989 | Crane et al. |
| 4,881,261 | A | | 11/1989 | Oliphant et al. |
| 4,893,328 | A | | 1/1990 | Peacock |
| 4,896,345 | A | | 1/1990 | Thorne |
| 4,897,866 | A | | 1/1990 | Majmudar et al. |
| 4,908,850 | A | | 3/1990 | Masson et al. |
| 4,924,488 | A | | 5/1990 | Kosich |
| 4,943,995 | A | | 7/1990 | Daudelin et al. |
| 4,953,204 | A | * | 8/1990 | Cuschleg, Jr. et al. ..... 379/266 |
| 4,972,461 | A | | 11/1990 | Brown et al. |
| 4,994,985 | A | | 2/1991 | Cree et al. |
| 5,001,710 | A | | 3/1991 | Gawrys et al. |
| 5,008,930 | A | | 4/1991 | Gawrys et al. |
| 5,017,917 | A | | 5/1991 | Fisher et al. |
| 5,020,095 | A | | 5/1991 | Morganstein et al. |
| 5,036,535 | A | | 7/1991 | Gechter et al. |
| 5,058,152 | A | | 10/1991 | Solomon et al. |
| 5,062,103 | A | * | 10/1991 | Davidson et al. ..... 379/265 |
| 5,073,890 | A | | 12/1991 | Danielsen |
| 5,095,504 | A | | 3/1992 | Nishikawa et al. |
| 5,117,225 | A | | 5/1992 | Wang |
| 5,136,633 | A | | 8/1992 | Tejada et al. |
| 5,155,761 | A | | 10/1992 | Hammond |
| 5,164,983 | A | | 11/1992 | Brown et al. |
| 5,168,515 | A | | 12/1992 | Gechter et al. |
| 5,175,800 | A | | 12/1992 | Galis et al. |
| 5,179,589 | A | | 1/1993 | Syu |
| 5,181,236 | A | | 1/1993 | LaVallee et al. |
| 5,181,239 | A | | 1/1993 | Jolissaint |
| 5,185,782 | A | | 2/1993 | Srinivasan |
| 5,202,828 | A | | 4/1993 | Vertelney et al. |
| 5,206,903 | A | | 4/1993 | Kohler et al. |
| 5,208,745 | A | | 5/1993 | Quentin et al. |
| 5,212,727 | A | | 5/1993 | Ramkumar |
| 5,214,688 | A | | 5/1993 | Szlam et al. |
| 5,231,670 | A | | 7/1993 | Goldhor et al. |
| 5,247,569 | A | | 9/1993 | Cave |
| 5,249,223 | A | | 9/1993 | Vanacore |
| 5,253,288 | A | | 10/1993 | Frey et al. |
| 5,256,863 | A | | 10/1993 | Ferguson et al. |
| 5,261,096 | A | | 11/1993 | Howarth |
| 5,271,058 | A | | 12/1993 | Andrews et al. |
| 5,274,635 | A | | 12/1993 | Rahman et al. |
| 5,274,700 | A | | 12/1993 | Gechter et al. |
| 5,274,782 | A | | 12/1993 | Chalasani et al. |
| 5,278,898 | A | | 1/1994 | Cambray et al. |
| 5,278,977 | A | | 1/1994 | Spencer et al. |
| 5,280,625 | A | | 1/1994 | Howarter et al. |
| 5,283,638 | A | | 2/1994 | Engberg et al. |
| 5,283,856 | A | | 2/1994 | Gross et al. |
| 5,285,494 | A | | 2/1994 | Sprecher et al. |
| 5,288,147 | A | | 2/1994 | Schaefer et al. |
| 5,291,550 | A | | 3/1994 | Levy et al. |
| 5,291,551 | A | | 3/1994 | Conn et al. |

(56) References Cited

U.S. PATENT DOCUMENTS 5,291,552 A 3/1994 Kerrigan et al.
5,299,259 A 3/1994 Otto
5,299,260 A 3/1994 Shaio
5,301,320 A 4/1994 McAtee et al.
5,309,505 A 5/1994 Szlam et al.
5,311,574 A 5/1994 Livanos
5,311,583 A 5/1994 Friedes et al.
5,315,709 A 5/1994 Alston, Jr. et al.
5,327,486 A 7/1994 Wolff et al.
5,329,583 A 7/1994 Jurgensen et al.
5,333,266 A 7/1994 Boaz et al.
5,335,268 A 8/1994 Kelly, Jr. et al.
5,335,269 A 8/1994 Steinlicht
5,343,477 A 8/1994 Yamada
5,343,518 A 8/1994 Kneipp
5,355,474 A 10/1994 Thuraisngham et al.
5,359,649 A 10/1994 Rosu et al.
5,363,507 A 11/1994 Nakayama et al.
5,367,329 A 11/1994 Nakagaki et al.
5,369,695 A * 11/1994 Chakravarti et al. ..... 379/230
5,384,766 A 1/1995 Yamato et al.
5,384,771 A 1/1995 Isidoro et al.
5,384,829 A 1/1995 Heileman, Jr. et al.
5,384,841 A 1/1995 Adams et al.
5,392,277 A 2/1995 Bernstein
5,392,328 A 2/1995 Schmidt et al.
5,392,345 A 2/1995 Otto
5,392,400 A 2/1995 Berkowitz et al.
5,402,474 A 3/1995 Miller et al.
5,414,762 A 5/1995 Flisik et al.
5,422,813 A 6/1995 Schuchman et al.
5,425,091 A 6/1995 Josephs
5,425,093 A 6/1995 Trefzger
5,426,594 A 6/1995 Wright et al.
5,428,608 A 6/1995 Freeman et al.
5,436,965 A 7/1995 Grossman et al.
5,436,967 A 7/1995 Hanson
5,440,719 A 8/1995 Hanes et al.
5,444,767 A 8/1995 Goetcheus et al.
5,444,774 A 8/1995 Friedes
5,444,823 A 8/1995 Nguyen
5,450,482 A 9/1995 Chen et al.
5,450,483 A 9/1995 Williams
5,452,350 A * 9/1995 Reynolds et al. ..... 379/127
5,455,903 A 10/1995 Jolissaint et al.
5,459,780 A 10/1995 Sand
5,463,685 A 10/1995 Gaechter et al.
5,465,286 A 11/1995 Clare et al.
5,467,391 A 11/1995 Donaghue, Jr. et al.
5,469,504 A 11/1995 Blaha
5,473,680 A 12/1995 Porter
5,475,813 A 12/1995 Cieslak et al.
5,479,487 A 12/1995 Hammond
5,481,616 A 1/1996 Freadman
5,488,648 A 1/1996 Womble
5,491,783 A 2/1996 Douglas et al.
5,493,564 A 2/1996 Mullan
5,495,522 A 2/1996 Allen et al.
5,495,523 A 2/1996 Stent et al.
5,496,392 A 3/1996 Sims et al.
5,497,317 A 3/1996 Hawkins et al.
5,497,371 A 3/1996 Ellis et al.
5,497,373 A 3/1996 Hulen et al.
5,500,891 A 3/1996 Harrington et al.
5,506,898 A 4/1996 Costantini et al.
5,509,062 A 4/1996 Carlsen
5,510,829 A 4/1996 Sugiyama et al.
5,511,117 A 4/1996 Zazzera
5,517,620 A 5/1996 Hashimoto et al.
5,519,773 A 5/1996 Dumas et al.
5,524,047 A 6/1996 Brown et al.
5,524,147 A 6/1996 Bean
5,526,353 A 6/1996 Henley et al.
5,528,678 A 6/1996 Kaplan
5,530,740 A 6/1996 Irribarren et al.
5,530,744 A * 6/1996 Charalambous et al. 379/112.05
5,533,103 A 7/1996 Peavey et al.
5,533,107 A 7/1996 Irwin et al.
5,533,108 A 7/1996 Harris et al.
5,533,110 A 7/1996 Pinard et al.
5,533,115 A 7/1996 Hollenbach et al.
5,535,211 A 7/1996 Yano
5,535,256 A 7/1996 Maloney et al.
5,535,323 A 7/1996 Miller et al.
5,537,470 A * 7/1996 Lee ..... 379/309
5,537,630 A 7/1996 Berry et al.
5,539,811 A 7/1996 Nakamura et al.
5,544,220 A 8/1996 Trefzger
5,546,452 A 8/1996 Andrews et al.
5,550,816 A 8/1996 Hardwick et al.
5,553,133 A 9/1996 Perkins
5,555,299 A 9/1996 Maloney et al.
5,555,426 A 9/1996 Johnson et al.
5,557,667 A 9/1996 Bruno et al.
5,559,868 A 9/1996 Blonder
5,559,877 A 9/1996 Ash et al.
5,559,878 A 9/1996 Keys et al.
5,561,711 A 10/1996 Muller
5,561,841 A 10/1996 Markus
5,563,805 A 10/1996 Arbuckle et al.
5,563,937 A 10/1996 Bruno et al.
5,566,294 A 10/1996 Kojima et al.
5,570,419 A 10/1996 Cave et al.
5,570,420 A 10/1996 Bress et al.
5,572,579 A 11/1996 Orriss et al.
5,572,643 A 11/1996 Judson
5,577,100 A 11/1996 McGregor et al.
5,577,105 A 11/1996 Baum et al.
5,583,862 A 12/1996 Callon
5,583,922 A 12/1996 Davis et al.
5,590,188 A 12/1996 Crockett
5,592,542 A 1/1997 Honda et al.
5,592,543 A 1/1997 Smith et al.
5,594,791 A 1/1997 Szlam et al.
5,598,532 A 1/1997 Liron
5,604,737 A 2/1997 Iwami et al.
5,606,602 A 2/1997 Johnson et al.
5,608,778 A 3/1997 Partridge, III
5,608,786 A 3/1997 Gordon
5,610,910 A 3/1997 Focsaneanu et al.
5,617,570 A 4/1997 Russell et al.
5,619,183 A 4/1997 Ziegra et al.
5,619,557 A 4/1997 Van Berkum
5,619,648 A 4/1997 Canale et al.
5,621,789 A 4/1997 McCalmont et al.
5,621,790 A 4/1997 Grossman et al.
5,623,600 A 4/1997 Ji et al.
5,624,265 A 4/1997 Redford et al.
5,625,404 A 4/1997 Grady et al.
5,625,676 A 4/1997 Greco et al.
5,625,682 A 4/1997 Gray et al.
5,627,764 A 5/1997 Schutzman et al.
5,627,884 A 5/1997 Williams et al.
5,630,127 A 5/1997 Moore et al.
5,632,011 A 5/1997 Landfield et al.
5,633,920 A 5/1997 Kikinis et al.
5,633,924 A 5/1997 Kaish et al.
5,635,918 A 6/1997 Tett
5,640,445 A 6/1997 David
5,642,411 A 6/1997 Theis
5,642,477 A 6/1997 de Carmo et al.
5,642,511 A 6/1997 Chow et al.
5,644,720 A 7/1997 Boll et al.
5,646,981 A 7/1997 Klein
5,649,105 A 7/1997 Aldred et al.
5,652,785 A 7/1997 Richardson, Jr. et al.
5,652,789 A 7/1997 Miner et al.
5,652,791 A 7/1997 Sunderman et al.
5,654,961 A 8/1997 Araujo et al.
5,655,015 A 8/1997 Walsh et al.
5,657,383 A 8/1997 Gerber et al.
5,659,542 A * 8/1997 Bell et al. ..... 370/496
5,659,604 A 8/1997 Beckmann
5,659,746 A 8/1997 Bankert et al.

(56) References Cited

U.S. PATENT DOCUMENTS 5,673,304 A 9/1997 Connor et al.
5,673,311 A 9/1997 Andruska et al.
5,673,322 A 9/1997 Pepe et al.
5,675,637 A 10/1997 Szlam et al.
5,684,870 A 11/1997 Maloney et al.
5,689,229 A 11/1997 Chaco et al.
5,692,033 A 11/1997 Farris
5,696,809 A 12/1997 Voit
5,696,811 A 12/1997 Maloney et al.
5,701,400 A 12/1997 Amado
5,703,943 A * 12/1997 Otto ..... 379/309
5,706,453 A 1/1998 Cheng et al.
5,708,702 A 1/1998 De Paul et al.
5,712,901 A 1/1998 Meermans
5,715,306 A 2/1998 Sunderman et al.
5,715,307 A 2/1998 Zazzera
5,715,432 A 2/1998 Xu et al.
5,717,747 A 2/1998 Boyle, III et al.
5,721,770 A 2/1998 Kohler
5,724,412 A 3/1998 Srinivasan
5,724,418 A 3/1998 Brady
5,726,984 A 3/1998 Kubler et al.
5,727,159 A 3/1998 Kikinis
5,729,594 A 3/1998 Klingman
5,732,078 A 3/1998 Arango
5,734,981 A 3/1998 Kennedy, III et al.
5,737,495 A 4/1998 Adams et al.
5,737,595 A 4/1998 Cohen et al.
5,737,726 A 4/1998 Cameron et al.
5,737,727 A 4/1998 Lehmann et al.
5,740,238 A 4/1998 Flockhart et al.
5,740,240 A 4/1998 Jolissaint
5,742,668 A 4/1998 Pepe et al.
5,742,670 A 4/1998 Bennett
5,742,675 A * 4/1998 Kilander et al. ..... 379/266
5,742,905 A 4/1998 Pepe et al.
5,745,687 A 4/1998 Randell
5,745,878 A 4/1998 Hashimoto et al.
5,748,884 A 5/1998 Royce et al.
5,748,907 A 5/1998 Crane
5,751,706 A 5/1998 Land et al.
5,751,707 A 5/1998 Voit et al.
5,751,795 A 5/1998 Hassler et al.
5,752,059 A 5/1998 Holleran et al.
5,752,244 A 5/1998 Rose et al.
5,752,246 A 5/1998 Rogers et al.
5,754,111 A 5/1998 Garcia
5,754,636 A 5/1998 Bayless et al.
5,754,639 A 5/1998 Flockhart et al.
5,754,655 A 5/1998 Hughes et al.
5,757,904 A 5/1998 Anderson
5,760,823 A 6/1998 Brunson et al.
5,761,289 A 6/1998 Keshav
5,764,736 A 6/1998 Shachar et al.
5,764,898 A 6/1998 Tsuji et al.
5,765,033 A 6/1998 Miloslavsky
5,768,360 A 6/1998 Reynolds et al.
5,768,527 A 6/1998 Zhu et al.
5,774,583 A 6/1998 Sasaki et al.
5,778,060 A 7/1998 Otto
5,778,178 A 7/1998 Arunachalam
5,778,377 A 7/1998 Marlin et al.
5,784,438 A 7/1998 Martinez
5,784,451 A 7/1998 Smith, Jr.
5,784,452 A 7/1998 Carney
5,787,160 A 7/1998 Chaney et al.
5,787,163 A 7/1998 Taylor et al.
5,790,635 A 8/1998 Dezonno
5,790,650 A 8/1998 Dunn et al.
5,790,789 A 8/1998 Suarez
5,790,798 A 8/1998 Beckett, II et al.
5,793,857 A 8/1998 Barnes et al.
5,793,861 A 8/1998 Haigh
5,794,039 A 8/1998 Guck
5,796,398 A 8/1998 Zimmer
5,796,729 A 8/1998 Greaney et al.
5,796,791 A 8/1998 Polcyn
5,796,813 A 8/1998 Sonnenberg
5,799,067 A 8/1998 Kikinis et al.
5,799,297 A 8/1998 Goodridge et al.
5,802,163 A 9/1998 Miloslavsky
5,802,253 A 9/1998 Gross et al.
5,802,283 A 9/1998 Grady et al.
5,802,314 A 9/1998 Tullis et al.
5,802,316 A 9/1998 Ito et al.
5,802,493 A 9/1998 Sheflott et al.
5,802,526 A 9/1998 Fawcett et al.
5,805,587 A 9/1998 Norris et al.
5,806,061 A 9/1998 Chaudhuri et al.
5,809,128 A 9/1998 McMullin
5,809,282 A 9/1998 Cooper et al.
5,809,512 A 9/1998 Kato
5,812,795 A 9/1998 Horovitz et al.
5,813,014 A 9/1998 Gustman
5,815,566 A 9/1998 Ramot et al.
5,818,935 A 10/1998 Maa
5,822,306 A 10/1998 Catchpole
5,822,400 A 10/1998 Smith
5,822,404 A 10/1998 Cave
5,822,526 A 10/1998 Waskiewicz
5,825,775 A 10/1998 Chin et al.
5,825,862 A 10/1998 Voit et al.
5,825,869 A 10/1998 Brooks et al.
5,825,870 A 10/1998 Miloslavsky
5,826,040 A 10/1998 Fargher et al.
5,826,269 A 10/1998 Hussey
5,828,747 A 10/1998 Fisher et al.
5,828,839 A 10/1998 Moncreiff
5,831,611 A 11/1998 Kennedy et al.
5,832,196 A 11/1998 Croslin et al.
5,835,090 A 11/1998 Clark et al.
5,835,583 A 11/1998 Hetz et al.
5,838,682 A 11/1998 Dekelbaum et al.
5,838,768 A 11/1998 Sumar et al.
5,838,773 A 11/1998 Eisner et al.
5,838,774 A 11/1998 Weisser, Jr.
5,841,854 A * 11/1998 Schumacher et al. ..... 379/224
5,842,131 A 11/1998 Yamane
5,844,980 A 12/1998 Patel et al.
5,844,982 A 12/1998 Knitl
5,847,484 A 12/1998 Kuyama et al.
5,848,131 A 12/1998 Shaffer et al.
5,848,143 A 12/1998 Andrews et al.
5,850,433 A 12/1998 Rondeau
5,852,814 A 12/1998 Allen
5,857,184 A 1/1999 Lynch
5,862,134 A 1/1999 Deng
5,862,211 A 1/1999 Roush
5,862,223 A 1/1999 Walker et al.
5,864,616 A 1/1999 Hartmeier
5,864,848 A 1/1999 Horvitz et al.
5,867,484 A 2/1999 Shaunfield
5,867,494 A 2/1999 Krishnaswamy et al.
5,867,495 A 2/1999 Elliott et al.
5,867,559 A 2/1999 Jorgensen et al.
5,867,562 A 2/1999 Scherer
5,867,822 A 2/1999 Sankar
5,870,464 A 2/1999 Brewster et al.
5,870,549 A 2/1999 Bobo, II
5,872,841 A 2/1999 King et al.
5,872,926 A 2/1999 Levac et al.
5,873,032 A 2/1999 Cox et al.
5,873,040 A 2/1999 Dunn et al.
5,873,076 A 2/1999 Barr et al.
5,878,126 A 3/1999 Velamuri et al.
5,878,130 A 3/1999 Andrews et al.
5,878,230 A 3/1999 Weber et al.
5,881,146 A 3/1999 Hamilton
5,883,891 A 3/1999 Williams et al.
5,884,032 A 3/1999 Bateman et al.
5,884,262 A 3/1999 Wise et al.
5,887,173 A 3/1999 Ogawa et al.
5,889,474 A 3/1999 LaDue
5,889,774 A 3/1999 Mirashrafi et al.

(56) References Cited

U.S. PATENT DOCUMENTS 5,889,799 A 3/1999 Grossman et al.
5,889,863 A 3/1999 Weber
5,892,764 A 4/1999 Riemann et al.
5,892,822 A 4/1999 Gottlieb et al.
5,893,912 A 4/1999 Freund et al.
5,894,512 A 4/1999 Zenner
5,896,444 A 4/1999 Perlman et al.
5,897,635 A 4/1999 Torres et al.
5,901,138 A 5/1999 Bader et al.
5,901,203 A 5/1999 Morganstein et al.
5,901,209 A 5/1999 Tannenbaum et al.
5,903,631 A 5/1999 Smith et al.
5,903,877 A 5/1999 Berkowitz et al.
5,905,495 A 5/1999 Tanaka et al.
5,905,792 A 5/1999 Miloslavsky
5,905,793 A 5/1999 Flockhart et al.
5,905,863 A 5/1999 Knowles et al.
5,907,547 A 5/1999 Foladare et al.
5,911,134 A 6/1999 Castonguay et al.
5,911,776 A 6/1999 Guck
5,914,941 A 6/1999 Janky
5,915,001 A 6/1999 Uppaluru
5,915,008 A 6/1999 Dulman
5,915,011 A 6/1999 Miloslavsky
5,915,012 A 6/1999 Miloslavsky
5,916,302 A 6/1999 Dunn et al.
5,917,817 A 6/1999 Dunn et al.
5,917,898 A 6/1999 Bassa et al.
5,918,213 A 6/1999 Bernard et al.
5,920,621 A 7/1999 Gottlieb
5,920,719 A 7/1999 Sutton et al.
5,920,865 A 7/1999 Ariga
5,923,745 A * 7/1999 Hurd ..... 379/265.02
5,923,879 A 7/1999 Sasmazel et al.
5,926,535 A * 7/1999 Reynolds ..... 379/221.06
5,926,538 A 7/1999 Deryugin et al.
5,926,539 A 7/1999 Shtivelman
5,933,492 A 8/1999 Turovski
5,937,051 A 8/1999 Hurd et al.
5,937,057 A 8/1999 Bell et al.
5,937,162 A 8/1999 Funk et al.
5,937,388 A 8/1999 Davis et al.
5,938,725 A 8/1999 Hara
5,940,075 A 8/1999 Mutschler, III et al.
5,940,478 A 8/1999 Vaudreuil et al.
5,940,479 A 8/1999 Guy et al.
5,940,488 A 8/1999 DeGrazia et al.
5,940,495 A 8/1999 Bondarenko et al.
5,940,496 A 8/1999 Gisby et al.
5,940,497 A 8/1999 Miloslavsky
5,940,598 A 8/1999 Strauss et al.
5,940,823 A 8/1999 Schreiber et al.
5,943,416 A 8/1999 Gisby
5,946,375 A 8/1999 Pattison et al.
5,946,386 A 8/1999 Rogers et al.
5,946,387 A 8/1999 Miloslavsky
5,948,054 A 9/1999 Nielsen
5,949,988 A 9/1999 Feisullin et al.
5,953,332 A 9/1999 Miloslavsky
5,953,405 A 9/1999 Miloslavsky
5,953,406 A 9/1999 LaRue et al.
5,956,482 A 9/1999 Agraharam et al.
5,956,729 A 9/1999 Goetz et al.
5,958,014 A 9/1999 Cave
5,958,016 A 9/1999 Chang et al.
5,958,064 A 9/1999 Judd et al.
5,959,982 A 9/1999 Federkins et al.
5,960,073 A 9/1999 Kikinis et al.
5,960,411 A 9/1999 Hartman et al.
5,963,632 A 10/1999 Miloslavsky
5,963,635 A 10/1999 Szlam et al.
5,966,427 A 10/1999 Shaffer et al.
5,966,695 A 10/1999 Melchione et al.
5,970,065 A 10/1999 Miloslavsky
5,970,134 A 10/1999 Highland et al.
5,974,135 A 10/1999 Breneman et al.
5,974,414 A 10/1999 Stanczak et al.
5,974,448 A 10/1999 Yamauchi et al.
RE36,416 E 11/1999 Szlam et al.
5,978,465 A 11/1999 Corduroy et al.
5,978,467 A 11/1999 Walker et al.
5,978,672 A 11/1999 Hartmaier et al.
5,978,836 A 11/1999 Ouchi
5,982,774 A 11/1999 Foladare et al.
5,982,870 A * 11/1999 Pershan et al. ..... 379/211.02
5,982,873 A 11/1999 Flockhart et al.
5,983,218 A 11/1999 Syeda-Mahmood
5,987,102 A 11/1999 Elliott et al.
5,987,117 A 11/1999 McNeil et al.
5,987,118 A 11/1999 Dickerman et al.
5,987,423 A 11/1999 Arnold et al.
5,987,446 A 11/1999 Corey et al.
5,991,365 A 11/1999 Pizano et al.
5,991,390 A 11/1999 Booton
5,991,391 A 11/1999 Miloslavsky
5,991,392 A 11/1999 Miloslavsky
5,991,393 A 11/1999 Kamen
5,991,394 A 11/1999 Dezonno et al.
5,991,395 A 11/1999 Miloslavsky
5,995,606 A 11/1999 Civanlar et al.
5,995,610 A * 11/1999 Smidt et al. ..... 379/207.02
5,995,614 A 11/1999 Miloslavsky
5,995,615 A 11/1999 Miloslavsky
5,996,000 A 11/1999 Shuster
5,999,525 A 12/1999 Krishnaswamy et al.
5,999,609 A 12/1999 Nishimura
5,999,965 A 12/1999 Kelly
6,002,396 A 12/1999 Davies
6,002,760 A 12/1999 Gisby
6,003,034 A 12/1999 Tuli
6,005,845 A 12/1999 Svennesson et al.
6,005,920 A 12/1999 Fuller et al.
6,005,931 A 12/1999 Neyman et al.
6,009,163 A 12/1999 Nabkel et al.
6,011,792 A 1/2000 Miloslavsky
6,011,844 A 1/2000 Uppaluru et al.
6,011,974 A 1/2000 Cedervall et al.
6,012,152 A 1/2000 Douik et al.
6,014,137 A 1/2000 Burns
6,014,138 A 1/2000 Cain et al.
6,014,379 A 1/2000 White et al.
6,014,437 A 1/2000 Acker et al.
6,014,647 A 1/2000 Nizzari et al.
6,018,578 A 1/2000 Bondarenko et al.
6,018,579 A 1/2000 Petrunka
6,018,761 A 1/2000 Uomini
6,021,262 A 2/2000 Cote et al.
6,021,411 A 2/2000 Brophy et al.
6,021,428 A 2/2000 Miloslavsky
6,023,684 A 2/2000 Pearson
6,023,723 A 2/2000 McCormick et al.
6,026,087 A 2/2000 Mirashrafi et al.
6,026,375 A 2/2000 Hall et al.
6,028,917 A 2/2000 Creamer et al.
6,029,195 A 2/2000 Herz
6,038,293 A 3/2000 McNerney et al.
6,038,537 A 3/2000 Matsuoka
6,041,116 A 3/2000 Meyers
6,044,144 A 3/2000 Becker et al.
6,044,146 A 3/2000 Gisby et al.
6,044,368 A 3/2000 Powers
6,046,762 A 4/2000 Sonesh et al.
6,047,060 A 4/2000 Fedorov et al.
6,049,272 A 4/2000 Lee et al.
6,049,547 A 4/2000 Fisher et al.
6,049,779 A 4/2000 Berkson
6,052,514 A 4/2000 Gill et al.
6,055,307 A 4/2000 Behnke et al.
6,055,308 A 4/2000 Miloslavsky et al.
6,055,513 A 4/2000 Katz et al.
6,058,163 A 5/2000 Pattison et al.
6,058,389 A 5/2000 Chandra et al.
6,058,435 A 5/2000 Sassin et al.
6,061,054 A 5/2000 Jolly

(56) References Cited

U.S. PATENT DOCUMENTS 6,064,667 A 5/2000 Gisby et al.
6,064,722 A 5/2000 Clise et al.
6,064,723 A 5/2000 Cohn et al.
6,064,730 A 5/2000 Ginsberg
6,064,973 A 5/2000 Smith et al.
6,067,357 A 5/2000 Kishinsky et al.
6,069,890 A 5/2000 White et al.
6,070,142 A 5/2000 McDonough et al.
6,070,144 A 5/2000 Ginsberg et al.
6,072,864 A 6/2000 Shtivelman et al.
6,073,013 A 6/2000 Agre et al.
6,073,105 A 6/2000 Sutcliffe et al.
6,073,109 A 6/2000 Flores et al.
6,073,124 A 6/2000 Krishnan et al.
6,075,783 A 6/2000 Voit
6,075,843 A 6/2000 Cave
6,076,101 A 6/2000 Kamakura et al.
6,076,105 A 6/2000 Wolff et al.
6,076,109 A 6/2000 Kikinis
6,078,581 A 6/2000 Shtivelman et al.
6,078,583 A 6/2000 Takahara et al.
6,081,591 A 6/2000 Skoog
6,081,592 A 6/2000 Battle
6,085,097 A 7/2000 Savery et al.
6,085,201 A 7/2000 Tso
6,088,340 A 7/2000 Buchholz et al.
6,088,696 A 7/2000 Moon et al.
6,088,717 A 7/2000 Reed et al.
6,094,479 A * 7/2000 Lindeberg et al. ..... 379/220.01
6,094,673 A 7/2000 Dilip et al.
6,097,792 A 8/2000 Thornton
6,097,804 A 8/2000 Gilbert et al.
6,097,938 A 8/2000 Paxson
6,098,065 A 8/2000 Skillen et al.
6,104,711 A 8/2000 Voit
6,104,800 A 8/2000 Benson
6,104,801 A 8/2000 Miloslavsky
6,104,802 A * 8/2000 Perlmutter ..... 379/220
6,108,688 A 8/2000 Nielsen
6,108,704 A 8/2000 Hutton et al.
6,108,711 A 8/2000 Beck et al.
6,112,085 A 8/2000 Garner et al.
6,115,596 A 9/2000 Raith et al.
6,115,742 A 9/2000 Franklin et al.
6,118,865 A 9/2000 Gisby
6,119,155 A 9/2000 Rossmann et al.
6,119,167 A 9/2000 Boyle et al.
6,122,360 A 9/2000 Neyman et al.
6,122,364 A 9/2000 Petrunka et al.
6,122,365 A 9/2000 Yegoshin
6,122,632 A 9/2000 Botts et al.
6,125,113 A 9/2000 Farris et al.
6,125,126 A 9/2000 Hallenstål
6,128,379 A 10/2000 Smyk
6,128,482 A 10/2000 Nixon et al.
6,128,603 A 10/2000 Dent et al.
6,128,646 A 10/2000 Miloslavsky
6,130,933 A 10/2000 Miloslavsky
6,134,217 A 10/2000 Stiliadis et al.
6,134,235 A 10/2000 Goldman et al.
6,134,315 A 10/2000 Galvin
6,134,318 A 10/2000 O'Neil
6,134,530 A 10/2000 Bunting et al.
6,137,870 A 10/2000 Scherer
6,138,139 A 10/2000 Beck et al.
6,141,345 A 10/2000 Goeddel et al.
6,148,074 A 11/2000 Miloslavsky et al.
6,157,653 A 12/2000 Kline et al.
6,157,655 A 12/2000 Shtivelman
6,157,924 A 12/2000 Austin
6,166,735 A 12/2000 Dom et al.
6,167,255 A 12/2000 Kennedy, III et al.
6,167,395 A 12/2000 Beck et al.
6,167,404 A 12/2000 Morcos et al.
6,170,011 B1 1/2001 Macleod Beck et al.
6,173,052 B1 1/2001 Brady
6,173,316 B1 1/2001 De Boor et al.
6,175,562 B1 1/2001 Cave
6,175,563 B1 1/2001 Miloslavsky
6,175,564 B1 1/2001 Miloslavsky et al.
6,175,620 B1 1/2001 Rouge et al.
6,175,842 B1 1/2001 Kirk et al.
6,178,239 B1 1/2001 Kishinsky et al.
6,181,336 B1 1/2001 Chiu et al.
6,181,736 B1 1/2001 McLaughlin et al.
6,181,788 B1 1/2001 Miloslavsky
6,182,059 B1 1/2001 Angotti et al.
6,182,249 B1 1/2001 Wookey et al.
6,185,287 B1 2/2001 Miloslavsky
6,185,291 B1 2/2001 Miloslavsky
6,185,292 B1 2/2001 Miloslavsky
6,185,427 B1 2/2001 Krasner et al.
6,185,535 B1 2/2001 Hedin et al.
6,188,688 B1 2/2001 Buskirk, Jr.
6,192,250 B1 2/2001 Buskens et al.
6,195,357 B1 2/2001 Polcyn
6,198,738 B1 3/2001 Chang et al.
6,198,739 B1 3/2001 Neyman et al.
6,201,804 B1 3/2001 Kikinis
6,201,863 B1 3/2001 Miloslavsky
6,205,135 B1 3/2001 Chinni et al.
6,205,412 B1 3/2001 Barskiy et al.
6,212,178 B1 4/2001 Beck et al.
6,215,783 B1 4/2001 Neyman
6,219,045 B1 4/2001 Leahy et al.
6,219,413 B1 4/2001 Burg
6,222,919 B1 4/2001 Hollatz et al.
6,226,285 B1 5/2001 Kozdon et al.
6,229,524 B1 5/2001 Chernock et al.
6,229,888 B1 5/2001 Miloslavsky
6,230,197 B1 5/2001 Beck et al.
6,233,234 B1 * 5/2001 Curry et al. ..... 370/356
6,233,616 B1 5/2001 Reid
6,236,857 B1 5/2001 Calabrese et al.
6,240,285 B1 5/2001 Blum et al.
6,243,092 B1 6/2001 Okita et al.
6,243,373 B1 6/2001 Turock
6,243,375 B1 6/2001 Speicher
6,243,379 B1 6/2001 Veerina et al.
6,243,713 B1 6/2001 Nelson et al.
6,249,807 B1 6/2001 Shaw et al.
6,253,129 B1 6/2001 Jenkins et al.
6,256,489 B1 7/2001 Lichter et al.
6,256,503 B1 7/2001 Stephens
6,259,692 B1 7/2001 Shtivelman et al.
6,259,774 B1 7/2001 Miloslavsky
6,259,786 B1 7/2001 Gisby
6,263,049 B1 7/2001 Kuhn
6,263,065 B1 7/2001 Durinovic-Johri et al.
6,263,066 B1 7/2001 Shtivelman et al.
6,263,359 B1 7/2001 Fong et al.
6,275,693 B1 8/2001 Lin et al.
6,278,976 B1 8/2001 Kochian
6,278,996 B1 8/2001 Richardson et al.
6,282,429 B1 8/2001 Baiyor et al.
6,282,565 B1 8/2001 Shaw et al.
6,285,316 B1 9/2001 Nir et al.
6,285,364 B1 9/2001 Giordano, III et al.
6,286,033 B1 9/2001 Kishinsky et al.
6,286,084 B1 9/2001 Wexler et al.
6,286,129 B1 9/2001 Agarwal et al.
6,289,094 B1 9/2001 Miloslavsky
6,292,181 B1 9/2001 Banerjee et al.
6,292,553 B1 9/2001 Fellingham et al.
6,295,353 B1 9/2001 Flockhart et al.
6,295,530 B1 9/2001 Ritchie et al.
6,298,041 B1 10/2001 Packer
6,301,480 B1 10/2001 Kennedy, III et al.
6,304,898 B1 10/2001 Shiigi
6,314,089 B1 11/2001 Szlam et al.
6,314,430 B1 11/2001 Chang
6,320,857 B1 11/2001 Tonnby et al.
6,320,951 B1 11/2001 Shtivelman et al.
6,324,276 B1 11/2001 Uppaluru et al.

(56) References Cited

U.S. PATENT DOCUMENTS 6,330,323 B1 12/2001 Gottlieb et al.
6,330,426 B2 12/2001 Brown et al.
6,332,022 B1 12/2001 Martinez
6,332,154 B2 12/2001 Beck et al.
6,332,163 B1 12/2001 Bowman-Amuah
6,333,980 B1 12/2001 Hollatz et al.
6,335,927 B1 1/2002 Elliott et al.
6,337,904 B1 1/2002 Gisby
6,339,593 B1 1/2002 Kikinis
6,343,281 B1 1/2002 Kato
6,345,290 B2 2/2002 Okada et al.
6,345,300 B1 2/2002 Bakshi et al.
6,345,305 B1 2/2002 Beck et al.
6,346,952 B1 2/2002 Shtivelman
6,347,085 B2 2/2002 Kelly
6,353,608 B1 3/2002 Cullers et al.
6,353,667 B1 3/2002 Foster et al.
6,359,981 B1 3/2002 Neyman et al.
6,362,838 B1 3/2002 Szlam et al.
6,363,411 B1 3/2002 Dugan et al.
6,366,575 B1 4/2002 Barkan et al.
6,366,586 B1 * 4/2002 Christie ..... 370/410
6,366,651 B1 4/2002 Griffith et al.
6,366,658 B1 4/2002 Bjornberg et al.
6,366,663 B1 4/2002 Bauer et al.
6,366,925 B1 4/2002 Meltzer et al.
6,370,238 B1 4/2002 Sansone et al.
6,370,508 B2 4/2002 Beck et al.
6,370,567 B1 4/2002 Ouchi
6,373,836 B1 4/2002 Deryugin et al.
6,373,937 B1 4/2002 Yegoshin
6,377,568 B1 4/2002 Kelly
6,377,583 B1 4/2002 Lyles et al.
6,377,944 B1 4/2002 Busey et al.
6,377,975 B1 4/2002 Florman
6,381,640 B1 4/2002 Beck et al.
6,385,191 B1 5/2002 Coffman et al.
6,385,202 B1 5/2002 Katseff et al.
6,385,646 B1 5/2002 Brown et al.
6,389,007 B1 5/2002 Shenkman et al.
6,389,133 B1 5/2002 Kamen
6,393,018 B2 5/2002 Miloslavsky
6,393,122 B1 5/2002 Belzile
6,393,481 B1 5/2002 Deo et al.
6,396,834 B1 5/2002 Bonomi et al.
6,396,919 B1 5/2002 Shimada et al.
6,400,725 B1 6/2002 Ross
6,401,066 B1 6/2002 McIntosh
6,401,094 B1 6/2002 Stemp et al.
6,405,033 B1 6/2002 Kennedy, III et al.
6,407,996 B1 6/2002 Witchalls
6,407,999 B1 6/2002 Olkkonen et al.
6,408,064 B1 6/2002 Fedorov et al.
6,411,806 B1 6/2002 Garner et al.
6,418,146 B1 7/2002 Miloslavsky
6,418,199 B1 7/2002 Perrone
6,424,709 B1 7/2002 Doyle et al.
6,427,002 B2 7/2002 Campbell et al.
6,430,174 B1 8/2002 Jennings et al.
6,430,282 B1 8/2002 Bannister et al.
6,434,231 B2 8/2002 Neyman et al.
6,434,530 B1 8/2002 Sloane et al.
6,434,549 B1 8/2002 Linetsky et al.
6,442,242 B1 8/2002 McAllister et al.
6,442,247 B1 8/2002 Garcia
6,445,788 B1 9/2002 Torba
6,449,260 B1 9/2002 Sassin et al.
6,449,270 B1 9/2002 Miloslavsky
6,449,358 B1 9/2002 Anisimov et al.
6,449,646 B1 9/2002 Sikora et al.
6,452,609 B1 9/2002 Katinsky et al.
6,453,038 B1 9/2002 McFarlane et al.
6,453,341 B1 9/2002 Miloslavsky
6,456,615 B1 9/2002 Kikinis
6,456,619 B1 9/2002 Sassin et al.
6,459,697 B1 10/2002 Neyman
6,463,148 B1 10/2002 Brady
6,470,010 B1 10/2002 Szviatovszki et al.
6,470,080 B2 10/2002 Perlmutter
6,473,787 B2 10/2002 Miloslavsky
6,480,600 B1 11/2002 Neyman et al.
6,487,663 B1 11/2002 Jaisimha et al.
6,490,350 B2 12/2002 McDuff et al.
6,493,353 B2 12/2002 Kelly et al.
6,493,433 B2 12/2002 Clabaugh et al.
6,493,447 B1 12/2002 Goss et al.
6,496,567 B1 12/2002 Bjornberg et al.
6,496,702 B1 12/2002 Lockhart
6,496,981 B1 12/2002 Wistendahl et al.
6,498,897 B1 12/2002 Nelson et al.
6,499,088 B1 12/2002 Wexler et al.
6,512,825 B1 1/2003 Lindholm et al.
6,515,996 B1 2/2003 Tonnby et al.
6,519,246 B1 2/2003 Strahs
6,519,617 B1 2/2003 Wanderski et al.
6,532,493 B1 3/2003 Aviani, Jr. et al.
6,535,492 B2 3/2003 Shtivelman
6,536,043 B1 3/2003 Guedalia
6,539,419 B2 3/2003 Beck et al.
6,546,405 B2 4/2003 Gupta et al.
6,549,539 B1 4/2003 Neyman
6,553,114 B1 4/2003 Fisher et al.
6,554,183 B1 4/2003 Sticha et al.
6,560,328 B1 5/2003 Bondarenko et al.
6,560,329 B1 5/2003 Draginich et al.
6,563,788 B1 5/2003 Torba et al.
6,567,854 B1 5/2003 Olshansky et al.
6,581,105 B2 6/2003 Miloslavsky et al.
6,594,269 B1 7/2003 Polcyn
6,597,685 B2 7/2003 Miloslavsky et al.
6,600,733 B2 7/2003 Deng
6,600,822 B2 7/2003 Kamen
6,603,752 B1 8/2003 Kikinis
6,611,498 B1 8/2003 Baker et al.
6,611,590 B1 8/2003 Lu et al.
6,614,780 B2 9/2003 Hakim et al.
6,614,781 B1 9/2003 Elliott et al.
6,625,139 B2 9/2003 Miloslavsky et al.
6,628,666 B1 9/2003 Pickering et al.
6,631,399 B1 10/2003 Stanczak et al.
6,633,910 B1 10/2003 Rajan et al.
6,650,747 B1 11/2003 Bala et al.
6,651,085 B1 11/2003 Woods
6,661,882 B1 12/2003 Muir et al.
6,668,286 B2 12/2003 Bateman et al.
6,678,718 B1 1/2004 Khouri et al.
6,681,010 B1 1/2004 Anderson et al.
6,687,241 B1 2/2004 Goss
6,690,788 B1 2/2004 Bauer et al.
6,693,893 B1 2/2004 Ehlinger
6,704,409 B1 3/2004 Dilip et al.
6,704,410 B1 3/2004 McFarlane et al.
6,704,411 B1 3/2004 Nishidate
6,707,903 B2 3/2004 Burok et al.
6,711,249 B2 3/2004 Weissman et al.
6,711,611 B2 3/2004 Hanhan
6,714,643 B1 3/2004 Gargeya et al.
6,718,032 B1 4/2004 Vrenjak et al.
6,718,366 B2 4/2004 Beck et al.
6,721,306 B1 4/2004 Farris et al.
6,731,626 B1 5/2004 Neyman
6,735,298 B2 5/2004 Neyman et al.
6,744,877 B1 6/2004 Edwards
6,744,878 B1 6/2004 Komissarchik et al.
6,748,211 B1 6/2004 Isaac et al.
6,751,210 B1 6/2004 Shaffer et al.
6,753,784 B1 6/2004 Sznaider et al.
6,754,181 B1 6/2004 Elliott et al.
6,760,322 B1 7/2004 Fukuda et al.
6,760,324 B1 7/2004 Scott et al.
6,760,428 B2 7/2004 Foster
6,760,727 B1 7/2004 Schroeder et al.
6,763,104 B1 7/2004 Judkins et al.
6,763,369 B1 7/2004 Ytuarte et al.

(56) References Cited

U.S. PATENT DOCUMENTS

| | | | |
|---|---|---|---|
| 6,771,765 | B1 | 8/2004 | Crowther et al. |
| 6,778,527 | B1 | 8/2004 | Amin |
| 6,785,375 | B1 | 8/2004 | Beddus et al. |
| 6,785,710 | B2 | 8/2004 | Kikinis |
| 6,785,740 | B1 | 8/2004 | Yoneda et al. |
| 6,788,779 | B2 | 9/2004 | Ostapchuck |
| 6,798,771 | B1 | 9/2004 | Low et al. |
| 6,801,520 | B2 | 10/2004 | Philonenko |
| 6,801,928 | B2 | 10/2004 | Nuestro |
| 6,804,346 | B1 | 10/2004 | Mewhinney |
| 6,816,871 | B2 | 11/2004 | Lee |
| 6,816,878 | B1 | 11/2004 | Zimmers et al. |
| 6,845,154 | B1 | 1/2005 | Cave et al. |
| 6,847,715 | B1 | 1/2005 | Swartz |
| 6,847,825 | B1 | 1/2005 | Duvall et al. |
| 6,850,602 | B1 | 2/2005 | Chou |
| 6,850,614 | B1 | 2/2005 | Collins |
| 6,859,529 | B2 | 2/2005 | Duncan et al. |
| 6,865,267 | B2 | 3/2005 | Dezonno |
| 6,868,391 | B1 | 3/2005 | Hultgren |
| 6,874,119 | B2 | 3/2005 | Macleod Beck et al. |
| 6,876,632 | B1 | 4/2005 | Takeda |
| 6,879,586 | B2 | 4/2005 | Miloslavsky et al. |
| 6,882,996 | B2 | 4/2005 | Preisig et al. |
| 6,898,190 | B2 | 5/2005 | Shtivelman et al. |
| 6,903,685 | B1 | 6/2005 | Arndt et al. |
| 6,907,455 | B1 | 6/2005 | Wolfe et al. |
| 6,910,072 | B2 | 6/2005 | Macleod Beck et al. |
| 6,912,272 | B2 | 6/2005 | Kirk et al. |
| 6,922,411 | B1 | 7/2005 | Taylor |
| 6,922,689 | B2 | 7/2005 | Shtivelman |
| 6,934,379 | B2 | 8/2005 | Falcon et al. |
| 6,934,381 | B1 | 8/2005 | Klein et al. |
| 6,944,272 | B1 | 9/2005 | Thomas |
| 6,958,994 | B2 | 10/2005 | Zhakov et al. |
| 6,965,914 | B2 | 11/2005 | Dowling |
| 6,970,844 | B1 | 11/2005 | Bierenbaum |
| 6,977,740 | B1 | 12/2005 | Mandalia |
| 6,981,020 | B2 | 12/2005 | Miloslavsky et al. |
| 6,985,478 | B2 | 1/2006 | Pogossiants et al. |
| 6,985,943 | B2 | 1/2006 | Deryugin et al. |
| 6,987,977 | B2 | 1/2006 | Lockhart |
| 6,996,603 | B1 | 2/2006 | Srinivasan |
| 7,006,614 | B2 | 2/2006 | Feinberg et al. |
| 7,020,264 | B1 | 3/2006 | Neyman et al. |
| 7,031,442 | B1 | 4/2006 | Neyman et al. |
| 7,036,128 | B1 | 4/2006 | Julia et al. |
| 7,039,176 | B2 | 5/2006 | Borodow et al. |
| 7,039,857 | B2 | 5/2006 | Beck et al. |
| 7,076,048 | B2 | 7/2006 | Lee et al. |
| 7,079,641 | B2 | 7/2006 | Ostapchuck |
| 7,080,092 | B2 | 7/2006 | Upton |
| 7,088,814 | B1 | 8/2006 | Shaffer et al. |
| 7,092,509 | B1 | 8/2006 | Mears et al. |
| 7,106,850 | B2 | 9/2006 | Campbell et al. |
| 7,110,523 | B2 | 9/2006 | Gagle et al. |
| 7,110,525 | B1 | 9/2006 | Heller et al. |
| 7,117,244 | B2 | 10/2006 | Florman et al. |
| 7,120,700 | B2 | 10/2006 | Macleod Beck et al. |
| 7,127,400 | B2 | 10/2006 | Koch |
| 7,133,830 | B1 | 11/2006 | Hoban et al. |
| 7,136,475 | B1 | 11/2006 | Rogers et al. |
| 7,155,496 | B2 | 12/2006 | Froyd et al. |
| 7,155,512 | B2 | 12/2006 | Lean et al. |
| 7,159,224 | B2 | 1/2007 | Sharma et al. |
| 7,167,924 | B1 | 1/2007 | Symonds et al. |
| 7,184,747 | B2 | 2/2007 | Bogat |
| 7,216,350 | B2 | 5/2007 | Martin et al. |
| 7,221,377 | B1 | 5/2007 | Okita et al. |
| 7,222,301 | B2 | 5/2007 | Makagon et al. |
| 7,231,032 | B2 | 6/2007 | Nevman et al. |
| 7,236,486 | B2 | 6/2007 | Baker et al. |
| 7,236,584 | B2 | 6/2007 | Torba |
| 7,242,760 | B2 | 7/2007 | Shires |
| 7,245,711 | B2 | 7/2007 | Margolis |
| 7,246,009 | B2 | 7/2007 | Hamblen et al. |
| 7,254,219 | B1 | 8/2007 | Hansen et al. |
| 7,254,641 | B2 | 8/2007 | Broughton et al. |
| 7,263,372 | B2 | 8/2007 | Lockhart |
| 7,263,671 | B2 | 8/2007 | Hull et al. |
| 7,269,263 | B2 | 9/2007 | Dedieu et al. |
| 7,272,627 | B2 | 9/2007 | Petrovykh |
| 7,277,424 | B1 | 10/2007 | Dowling |
| 7,277,536 | B2 | 10/2007 | Ostapchuk |
| 7,277,916 | B2 | 10/2007 | Nuestro |
| 7,283,519 | B2 | 10/2007 | Girard |
| 7,336,649 | B1 | 2/2008 | Huang |
| 7,363,228 | B2 | 4/2008 | Wyss et al. |
| 7,372,956 | B1 | 5/2008 | Kikinis et al. |
| 7,373,405 | B2 | 5/2008 | Deryugin et al. |
| 7,373,410 | B2 | 5/2008 | Monza et al. |
| 7,376,227 | B2 | 5/2008 | Anisimov et al. |
| 7,376,431 | B2 | 5/2008 | Niedermeyer |
| 7,401,112 | B1 | 7/2008 | Matz et al. |
| 7,415,009 | B2 | 8/2008 | Neyman |
| 7,418,094 | B2 | 8/2008 | Golitsin et al. |
| 7,428,303 | B2 | 9/2008 | Campbell et al. |
| 7,434,204 | B1 | 10/2008 | Everingham et al. |
| 7,460,496 | B2 | 12/2008 | Miloslavsky et al. |
| 7,496,640 | B2 | 2/2009 | Hanhan |
| 7,535,479 | B2 | 5/2009 | Okita et al. |
| 7,558,383 | B2 | 7/2009 | Shtivelman et al. |
| 7,561,887 | B2 | 7/2009 | Lockhart |
| 7,564,840 | B2 | 7/2009 | Elliott et al. |
| 7,565,428 | B2 | 7/2009 | Deryugin et al. |
| 7,609,829 | B2 | 10/2009 | Wang et al. |
| 7,610,347 | B2 | 10/2009 | Petrovykh |
| 7,619,996 | B2 | 11/2009 | Miloslavsky et al. |
| 7,669,182 | B2 | 2/2010 | Garcia |
| 7,672,998 | B1 | 3/2010 | Haskins et al. |
| 7,706,520 | B1 | 4/2010 | Waterson et al. |
| 7,715,332 | B2 | 5/2010 | Miloslavsky et al. |
| 7,716,292 | B2 | 5/2010 | Kikinis |
| 7,739,325 | B1 | 6/2010 | Okita et al. |
| 7,764,231 | B1 | 7/2010 | Karr et al. |
| 7,769,161 | B1 | 8/2010 | Hession et al. |
| 7,779,067 | B2 | 8/2010 | Beck et al. |
| 7,792,773 | B2 | 9/2010 | McCord et al. |
| 7,808,977 | B2 | 10/2010 | Kikinis |
| 7,823,167 | B2 | 10/2010 | Makagon et al. |
| 7,853,717 | B2 | 12/2010 | Petrovykh |
| 7,856,095 | B2 | 12/2010 | Brown |
| 7,903,807 | B2 | 3/2011 | Neyman et al. |
| 7,907,598 | B2 | 3/2011 | Anisimov et al. |
| 7,929,978 | B2 | 4/2011 | Lockhart |
| 7,957,401 | B2 | 6/2011 | Zalenski et al. |
| 8,009,821 | B1 | 8/2011 | Apparao et al. |
| 8,018,921 | B2 | 9/2011 | Pogossiants et al. |
| 8,024,401 | B1 | 9/2011 | Gurbani et al. |
| 8,031,698 | B2 | 10/2011 | Neyman |
| 8,036,214 | B2 | 10/2011 | Elliott et al. |
| 8,059,812 | B1 | 11/2011 | Bundy |
| 8,068,598 | B1 | 11/2011 | Russi et al. |
| 8,085,761 | B2 | 12/2011 | Elliott et al. |
| 8,089,958 | B2 | 1/2012 | Elliott et al. |
| 8,126,133 | B1 | 2/2012 | Everingham et al. |
| 8,130,749 | B2 | 3/2012 | Kikinis |
| 8,180,662 | B2 | 5/2012 | Minert et al. |
| 8,180,666 | B2 | 5/2012 | Minert et al. |
| 8,199,891 | B2 | 6/2012 | Brown et al. |
| 8,209,207 | B2 | 6/2012 | Minert et al. |
| 8,209,209 | B2 | 6/2012 | Minert et al. |
| 8,223,948 | B2 | 7/2012 | Minert et al. |
| 8,226,477 | B1 | 7/2012 | Machado et al. |
| 8,254,404 | B2 | 8/2012 | Rabenko et al. |
| 8,254,558 | B2 | 8/2012 | Minert et al. |
| 8,270,421 | B2 | 9/2012 | Elliott et al. |
| 8,275,111 | B2 | 9/2012 | Golitsin et al. |
| 8,345,856 | B1 | 1/2013 | Anisimov et al. |
| 8,351,595 | B2 | 1/2013 | Peterson et al. |
| 8,358,769 | B2 | 1/2013 | Neyman et al. |
| 8,395,994 | B2 | 3/2013 | Stevenson et al. |
| 8,396,205 | B1 | 3/2013 | Lowry et al. |
| 8,411,844 | B1 | 4/2013 | Anisimov et al. |

(56) References Cited

U.S. PATENT DOCUMENTS 8,693,347 B2 4/2014 Elliott et al.
9,002,920 B2 4/2015 Deryugin et al.
RE45,583 E 6/2015 Lockhart
9,118,781 B1 8/2015 Kavulak et al.
2001/0000458 A1 4/2001 Shtivelman et al.
2001/0001150 A1 5/2001 Miloslavsky
2001/0005382 A1 6/2001 Cave et al.
2001/0011366 A1 8/2001 Beck et al.
2001/0013041 A1 8/2001 MacLeod Beck et al.
2001/0014604 A1 8/2001 Kingdon et al.
2001/0023430 A1 9/2001 Srinivasan
2001/0023448 A1 9/2001 Hanhan
2001/0024497 A1 9/2001 Campbell et al.
2001/0025309 A1 9/2001 Macleod Beck et al.
2001/0028649 A1 10/2001 Pogossiants et al.
2001/0029519 A1 10/2001 Hallinan et al.
2001/0037316 A1 11/2001 Shiloh
2001/0038624 A1 11/2001 Greenberg
2001/0040887 A1* 11/2001 Shtivelman et al. ..... 370/352
2001/0042095 A1 11/2001 Kim et al.
2001/0043586 A1 11/2001 Miloslavsky
2001/0043589 A1 11/2001 Kikinis
2001/0044676 A1 11/2001 Macleod Beck et al.
2001/0044828 A1 11/2001 Kikinis
2001/0054064 A1 12/2001 Kannan
2002/0001300 A1 1/2002 Miloslavsky et al.
2002/0012428 A1 1/2002 Neyman et al.
2002/0013150 A1 1/2002 McKenna et al.
2002/0019844 A1 2/2002 Kurowski et al.
2002/0019846 A1 2/2002 Miloslavsky et al.
2002/0025819 A1 2/2002 Cetusic et al.
2002/0035647 A1 3/2002 Brown et al.
2002/0037076 A1 3/2002 Perlmutter
2002/0041674 A1 4/2002 Kamen
2002/0054579 A1 5/2002 Miloslavsky
2002/0055853 A1 5/2002 Macleod Beck et al.
2002/0056000 A1 5/2002 Albert Coussement
2002/0057671 A1 5/2002 Kikinis
2002/0059164 A1 5/2002 Shtivelman
2002/0059374 A1 5/2002 Nuestro
2002/0060988 A1 5/2002 Shtivelman
2002/0062385 A1 5/2002 Dowling
2002/0064149 A1 5/2002 Elliott et al.
2002/0071529 A1 6/2002 Nelkenbaum
2002/0076031 A1 6/2002 Falcon et al.
2002/0078150 A1 6/2002 Thompson et al.
2002/0087648 A1 7/2002 Petrovykh
2002/0091726 A1 7/2002 Macleod Beck et al.
2002/0095462 A1 7/2002 Beck et al.
2002/0097708 A1 7/2002 Deng
2002/0099738 A1 7/2002 Grant
2002/0101866 A1 8/2002 Miloslavsky et al.
2002/0101880 A1 8/2002 Kim
2002/0103998 A1 8/2002 DeBruine
2002/0105957 A1 8/2002 Bondarenko et al.
2002/0114278 A1 8/2002 Coussement
2002/0114441 A1 8/2002 Coussement
2002/0120719 A1 8/2002 Lee et al.
2002/0123899 A1 9/2002 Hall et al.
2002/0126678 A1 9/2002 Kelly et al.
2002/0126828 A1 9/2002 Kamen
2002/0131399 A1 9/2002 Philonenko
2002/0136167 A1 9/2002 Steele et al.
2002/0150311 A1 10/2002 Lynn
2002/0169834 A1 11/2002 Miloslavsky et al.
2002/0176404 A1 11/2002 Girard
2003/0002479 A1 1/2003 Vortman et al.
2003/0002652 A1 1/2003 Neyman et al.
2003/0002654 A1 1/2003 Torba
2003/0007621 A1 1/2003 Graves et al.
2003/0009530 A1 1/2003 Philonenko et al.
2003/0018702 A1 1/2003 Broughton et al.
2003/0018729 A1 1/2003 Miloslavsky
2003/0021259 A1 1/2003 Miloslavsky et al.
2003/0021406 A1 1/2003 Ostapchuck
2003/0026414 A1 2/2003 Baker et al.
2003/0037113 A1 2/2003 Petrovykh
2003/0043832 A1 3/2003 Anisimov et al.
2003/0051037 A1 3/2003 Sundaram et al.
2003/0055884 A1 3/2003 Yuen et al.
2003/0058884 A1 3/2003 Kallner et al.
2003/0084128 A1 5/2003 Anderson et al.
2003/0084349 A1 5/2003 Friedrichs et al.
2003/0088421 A1 5/2003 Maes et al.
2003/0097457 A1 5/2003 Saran et al.
2003/0099343 A1 5/2003 Dezonno
2003/0115353 A1 6/2003 Deryugin et al.
2003/0125048 A1 7/2003 Lockhart
2003/0135592 A1 7/2003 Vetter et al.
2003/0161296 A1 8/2003 Butler et al.
2003/0161448 A1 8/2003 Parolkar et al.
2003/0179729 A1 9/2003 MacLeod Beck et al.
2003/0212558 A1 11/2003 Matula
2003/0216923 A1 11/2003 Gilmore et al.
2003/0219029 A1 11/2003 Pickett
2003/0220875 A1 11/2003 Lam et al.
2003/0229529 A1 12/2003 Mui et al.
2004/0017797 A1 1/2004 Chen et al.
2004/0019638 A1 1/2004 Makagon et al.
2004/0030557 A1 2/2004 Culy et al.
2004/0047302 A1 3/2004 Dezonno et al.
2004/0064348 A1 4/2004 Humenansky et al.
2004/0081183 A1 4/2004 Monza et al.
2004/0083195 A1 4/2004 McCord et al.
2004/0083281 A1 4/2004 Makagon et al.
2004/0083479 A1 4/2004 Bondarenko et al.
2004/0083482 A1 4/2004 Makagon et al.
2004/0102977 A1 5/2004 Metzler et al.
2004/0107025 A1 6/2004 Ransom et al.
2004/0111269 A1 6/2004 Koch
2004/0120502 A1 6/2004 Strathmeyer et al.
2004/0169675 A1 9/2004 Beck et al.
2004/0179516 A1 9/2004 Neyman
2004/0181574 A1 9/2004 Hanhan
2004/0199580 A1 10/2004 Zhakov et al.
2004/0208134 A1 10/2004 Neyman et al.
2004/0208309 A1 10/2004 Miloslavsky
2004/0213400 A1 10/2004 Golitsin et al.
2004/0223490 A1 11/2004 Donovan et al.
2004/0264678 A1 12/2004 Ostapchuck
2004/0267892 A1 12/2004 Kikinis
2005/0013417 A1 1/2005 Zimmers et al.
2005/0033851 A1 2/2005 Kikinis
2005/0041678 A1 2/2005 Nuestro
2005/0128961 A1 6/2005 Miloslavsky et al.
2005/0147090 A1 7/2005 MacLeod Beck et al.
2005/0154792 A1 7/2005 Deryugin et al.
2005/0207559 A1 9/2005 Shtivelman et al.
2006/0029206 A1 2/2006 Anisimov et al.
2006/0034262 A1 2/2006 Pogossiants et al.
2006/0079250 A1 4/2006 Lockhart
2006/0080107 A1 4/2006 Hill et al.
2006/0095568 A1 5/2006 Makagon et al.
2006/0109976 A1 5/2006 Sundaram et al.
2006/0133594 A1 6/2006 Neyman et al.
2006/0153173 A1 7/2006 Beck et al.
2006/0209797 A1 9/2006 Anisimov et al.
2006/0210047 A1 9/2006 Neyman et al.
2006/0245421 A1 11/2006 Ostapchuk
2007/0002744 A1 1/2007 Mewhinney et al.
2007/0041525 A1 2/2007 Tingley et al.
2007/0041567 A1 2/2007 Anisimov et al.
2007/0071224 A1 3/2007 Shtivelman et al.
2007/0110043 A1 5/2007 Girard
2007/0127707 A1 6/2007 Koser et al.
2007/0143301 A1 6/2007 Tran
2007/0195940 A1 8/2007 Miloslavsky et al.
2007/0213073 A1 9/2007 Lockhart
2007/0274495 A1 11/2007 Youd et al.
2008/0002822 A1 1/2008 Petrovykh
2008/0013531 A1 1/2008 Elliott et al.
2008/0025295 A1 1/2008 Elliott et al.
2008/0043728 A1 2/2008 Miloslavsky et al.
2008/0043955 A1 2/2008 Shtivelman et al.

(56) References Cited

U.S. PATENT DOCUMENTS

| | | | |
|---|---|---|---|
| 2008/0043975 | A1 | 2/2008 | Miloslavsky et al. |
| 2008/0043977 | A1 | 2/2008 | Neyman et al. |
| 2008/0046504 | A1 | 2/2008 | Deryugin et al. |
| 2008/0046531 | A1 | 2/2008 | Shtivelman et al. |
| 2008/0049731 | A1 | 2/2008 | Kikinis |
| 2008/0049737 | A1 | 2/2008 | Neyman |
| 2008/0049928 | A1 | 2/2008 | Miloslavsky et al. |
| 2008/0049929 | A1 | 2/2008 | Miloslavsky et al. |
| 2008/0062971 | A1 | 3/2008 | Kikinis |
| 2008/0130844 | A1 | 6/2008 | Hubbard et al. |
| 2008/0205378 | A1 | 8/2008 | Wyss et al. |
| 2008/0222240 | A1 | 9/2008 | Deryugin et al. |
| 2008/0285739 | A1 | 11/2008 | Golitsin et al. |
| 2009/0089136 | A1 | 4/2009 | Minert et al. |
| 2009/0089451 | A1 | 4/2009 | Petrovykh |
| 2009/0227267 | A1 | 9/2009 | Lockhart |
| 2009/0240346 | A1 | 9/2009 | Cadigan, Jr. et al. |
| 2010/0157979 | A1 | 6/2010 | Anisimov et al. |
| 2010/0198930 | A1 | 8/2010 | Kikinis |
| 2011/0099602 | A1 | 4/2011 | Apparao et al. |
| 2011/0178946 | A1 | 7/2011 | Minert et al. |
| 2011/0179304 | A1 | 7/2011 | Peterson |
| 2011/0179398 | A1 | 7/2011 | Peterson |
| 2011/0182418 | A1 | 7/2011 | Anisimov et al. |
| 2012/0047266 | A1 | 2/2012 | Minert |
| 2012/0066016 | A1 | 3/2012 | Minert et al. |
| 2012/0177195 | A1 | 7/2012 | Elliott et al. |
| 2012/0195415 | A1 | 8/2012 | Wyss et al. |
| 2012/0250849 | A1 | 10/2012 | Liu et al. |
| 2013/0016115 | A1 | 1/2013 | Minert et al. |
| 2013/0070757 | A1 | 3/2013 | Elliott et al. |
| 2013/0129067 | A1 | 5/2013 | Neyman et al. |
| 2013/0230160 | A1 | 9/2013 | Neyman et al. |
| 2014/0376708 | A1 | 12/2014 | Deryugin et al. |
| 2014/0379936 | A1 | 12/2014 | Anisimov et al. |
| 2015/0201021 | A1 | 7/2015 | Beck et al. |
| 2015/0244870 | A1 | 8/2015 | Neyman et al. |

FOREIGN PATENT DOCUMENTS

| | | | |
|---|---|---|---|
| AT | 281039 | | 11/2004 |
| AT | 316736 | | 2/2006 |
| AT | 317621 | | 2/2006 |
| AT | 318048 | | 3/2006 |
| AT | 337678 | | 9/2006 |
| AT | 379921 | | 12/2007 |
| AT | 380434 | | 12/2007 |
| AT | 384398 | | 2/2008 |
| AT | 388578 | | 3/2008 |
| AT | 401736 | | 8/2008 |
| AT | 413059 | | 11/2008 |
| AT | 424090 | | 3/2009 |
| AT | 465451 | | 5/2010 |
| AT | 474415 | | 7/2010 |
| AU | 2604797 | | 10/1997 |
| AU | 718233 | B2 | 3/1998 |
| AU | 5274398 | | 3/1998 |
| AU | 6023598 | | 8/1998 |
| AU | 6034698 | | 8/1998 |
| AU | 6167398 | | 8/1998 |
| AU | 6319498 | | 8/1998 |
| AU | 6655298 | | 9/1998 |
| AU | 6655398 | | 9/1998 |
| AU | 7099298 | | 10/1998 |
| AU | 735134 | B2 | 3/1999 |
| AU | 736449 | B2 | 4/1999 |
| AU | 737483 | B2 | 4/1999 |
| AU | 743217 | B2 | 4/1999 |
| AU | 745404 | B2 | 4/1999 |
| AU | 748636 | B2 | 4/1999 |
| AU | 9225198 | | 4/1999 |
| AU | 9228098 | | 4/1999 |
| AU | 9381998 | | 4/1999 |
| AU | 9479298 | | 4/1999 |
| AU | 743880 | B2 | 5/1999 |
| AU | 1118899 | | 5/1999 |
| AU | 740090 | B2 | 6/1999 |
| AU | 744340 | B2 | 6/1999 |
| AU | 1120099 | | 6/1999 |
| AU | 1276799 | | 6/1999 |
| AU | 1286299 | | 6/1999 |
| AU | 743737 | B2 | 8/1999 |
| AU | 758713 | B2 | 8/1999 |
| AU | 2595499 | | 8/1999 |
| AU | 2595599 | | 8/1999 |
| AU | 2667299 | | 8/1999 |
| AU | 2674899 | | 8/1999 |
| AU | 739979 | B2 | 9/1999 |
| AU | 741437 | B2 | 9/1999 |
| AU | 2674799 | | 9/1999 |
| AU | 749023 | B2 | 12/1999 |
| AU | 4427299 | | 12/1999 |
| AU | 4819499 | | 12/1999 |
| AU | 746085 | B2 | 1/2000 |
| AU | 4426799 | | 1/2000 |
| AU | 750215 | B2 | 4/2000 |
| AU | 754238 | B2 | 4/2000 |
| AU | 755234 | B2 | 4/2000 |
| AU | 5807099 | | 4/2000 |
| AU | 5810599 | | 4/2000 |
| AU | 5813699 | | 4/2000 |
| AU | 748456 | B2 | 5/2000 |
| AU | 751143 | B2 | 5/2000 |
| AU | 751232 | B2 | 5/2000 |
| AU | 751269 | B2 | 5/2000 |
| AU | 751301 | B2 | 5/2000 |
| AU | 755138 | B2 | 5/2000 |
| AU | 1233800 | | 5/2000 |
| AU | 1327200 | | 5/2000 |
| AU | 1328200 | | 5/2000 |
| AU | 1328300 | | 5/2000 |
| AU | 1454700 | | 5/2000 |
| AU | 1717700 | | 5/2000 |
| AU | 2045900 | | 6/2000 |
| AU | 748447 | B2 | 7/2000 |
| AU | 3113800 | | 7/2000 |
| AU | 2964900 | | 9/2000 |
| AU | 3470800 | | 9/2000 |
| AU | 45077000 | A0 | 2/2001 |
| AU | 6798300 | | 4/2001 |
| AU | 1077201 | | 6/2001 |
| AU | 1077301 | | 6/2001 |
| AU | 8006800 | | 6/2001 |
| AU | 4732501 | | 10/2001 |
| AU | 5384201 | | 10/2001 |
| AU | 5724801 | | 11/2001 |
| AU | 756555 | B2 | 1/2003 |
| AU | 2003300117 | | 8/2004 |
| BR | 9913621 | A | 5/2001 |
| BR | 99136222 | A | 5/2001 |
| CA | 2178705 | A1 | 3/1997 |
| CA | 2391428 | A1 | 3/1997 |
| CA | 2259912 | C | 1/1998 |
| CA | 2280002 | A1 | 8/1998 |
| CA | 2289193 | A1 | 12/1998 |
| CA | 2289198 | a1 | 12/1998 |
| CA | 2302397 | A1 | 3/1999 |
| CA | 2302488 | A1 | 3/1999 |
| CA | 2302674 | A1 | 3/1999 |
| CA | 2302680 | A1 | 3/1999 |
| CA | 2302704 | A1 | 3/1999 |
| CA | 2302678 | A1 | 4/1999 |
| CA | 2308590 | A1 | 5/1999 |
| CA | 2309185 | A1 | 5/1999 |
| CA | 2309186 | A1 | 5/1999 |
| CA | 2309183 | A1 | 6/1999 |
| CA | 2320979 | A1 | 6/1999 |
| CA | 2320978 | A1 | 8/1999 |
| CA | 2320989 | A1 | 8/1999 |
| CA | 2330608 | A1 | 12/1999 |
| CA | 2334513 | A1 | 12/1999 |
| CA | 2343286 | A1 | 3/2000 |
| CA | 2343288 | A1 | 3/2000 |

(56) References Cited

FOREIGN PATENT DOCUMENTS

| | | | |
|---|---|---|---|
| CA | 2343756 | A1 | 3/2000 |
| CA | 2347721 | A1 | 5/2000 |
| CA | 2348567 | A1 | 5/2000 |
| CA | 2348574 | A1 | 5/2000 |
| CA | 2348575 | C | 5/2000 |
| CA | 2348994 | A1 | 5/2000 |
| CA | 2348999 | A1 | 5/2000 |
| CA | 2350515 | A1 | 5/2000 |
| CA | 2352973 | A1 | 5/2000 |
| CA | 2362172 | A1 | 8/2000 |
| CA | 2313595 | A1 | 2/2001 |
| CN | 1282484 | A | 1/2001 |
| CN | 1282485 | A | 1/2001 |
| CN | 1285990 | A | 2/2001 |
| CN | 1285991 | A | 2/2001 |
| CN | 1293798 | A | 5/2001 |
| CN | 1293858 | A | 5/2001 |
| CN | 1298590 | A | 6/2001 |
| CN | 1309861 | A | 8/2001 |
| CN | 1310622 | A | 8/2001 |
| CN | 1323418 | A | 11/2001 |
| CN | 1323421 | A | 11/2001 |
| CN | 1354942 | A | 6/2002 |
| CN | 1130061 | C | 12/2003 |
| CN | 1132399 | C | 12/2003 |
| CN | 1145314 | C | 4/2004 |
| CN | 1149521 | C | 5/2004 |
| CN | 1152549 | C | 6/2004 |
| CN | 1512724 | A | 7/2004 |
| CN | 1520197 | A | 8/2004 |
| CN | 1197336 | C | 4/2005 |
| CN | 1200548 | C | 5/2005 |
| CN | 1662025 | A | 8/2005 |
| CN | 1232077 | C | 12/2005 |
| CN | 1756280 | A | 4/2006 |
| CN | 100477702 | C | 4/2009 |
| CN | 100547568 | C | 10/2009 |
| CN | 102257789 | A | 11/2011 |
| CN | 101635776 | B | 12/2011 |
| DE | 60011863 | T2 | 12/2004 |
| DE | 69730498 | T2 | 9/2005 |
| DE | 60015236 | T2 | 2/2006 |
| DE | 69832275 | T2 | 8/2006 |
| DE | 69833285 | T2 | 9/2006 |
| DE | 69833394 | T2 | 10/2006 |
| DE | 69833462 | T2 | 10/2006 |
| DE | 69833935 | T2 | 11/2006 |
| DE | 60214191 | T2 | 12/2006 |
| DE | 69834184 | T2 | 3/2007 |
| DE | 69838795 | T2 | 10/2008 |
| DE | 69838814 | T2 | 11/2008 |
| DE | 69839022 | T2 | 1/2009 |
| DE | 69839222 | T2 | 3/2009 |
| EP | 0193961 | A2 | 9/1986 |
| EP | 0236013 | A2 | 9/1987 |
| EP | 0376517 | A2 | 7/1990 |
| EP | 0420779 | A2 | 4/1991 |
| EP | 0424015 | A2 | 4/1991 |
| EP | 0425161 | A2 | 5/1991 |
| EP | 0425163 | A2 | 5/1991 |
| EP | 0515068 | A2 | 11/1992 |
| EP | 0528732 | A1 | 2/1993 |
| EP | 0532972 | A1 | 3/1993 |
| EP | 0539105 | A2 | 4/1993 |
| EP | 0559979 | A2 | 9/1993 |
| EP | 0568770 | A2 | 11/1993 |
| EP | 0610625 | A2 | 8/1994 |
| EP | 0647050 | A2 | 4/1995 |
| EP | 0647051 | A1 | 4/1995 |
| EP | 0660573 | A2 | 6/1995 |
| EP | 0701358 | A1 | 3/1996 |
| EP | 0705017 | A2 | 4/1996 |
| EP | 0721268 | A2 | 7/1996 |
| EP | 0725526 | A2 | 8/1996 |
| EP | 0734187 | A2 | 9/1996 |
| EP | 0753950 | A2 | 10/1996 |
| EP | 0748102 | A2 | 12/1996 |
| EP | 0753956 | A2 | 1/1997 |
| EP | 0755146 | A2 | 1/1997 |
| EP | 0758175 | A1 | 2/1997 |
| EP | 0771095 | A2 | 5/1997 |
| EP | 0792076 | A2 | 8/1997 |
| EP | 0806858 | A2 | 11/1997 |
| EP | 0817455 | A2 | 1/1998 |
| EP | 0856980 | A2 | 8/1998 |
| EP | 0863651 | A2 | 9/1998 |
| EP | 0866407 | A1 | 9/1998 |
| EP | 0869639 | A2 | 10/1998 |
| EP | 0883306 | A2 | 12/1998 |
| EP | 0908047 | A1 | 4/1999 |
| EP | 0958560 | A1 | 11/1999 |
| EP | 0962087 | a1 | 12/1999 |
| EP | 1006706 | A2 | 6/2000 |
| EP | 1013062 | A1 | 6/2000 |
| EP | 1013066 | A1 | 6/2000 |
| EP | 1016280 | A1 | 7/2000 |
| EP | 1044553 | A1 | 10/2000 |
| EP | 1064630 | A1 | 1/2001 |
| EP | 1066712 | A1 | 1/2001 |
| EP | 1075153 | A2 | 2/2001 |
| EP | 1087597 | A2 | 3/2001 |
| EP | 1088277 | A1 | 4/2001 |
| EP | 1092313 | A1 | 4/2001 |
| EP | 1107555 | A2 | 6/2001 |
| EP | 1114543 | A1 | 7/2001 |
| EP | 1125214 | A1 | 8/2001 |
| EP | 1133677 | A2 | 9/2001 |
| EP | 1133736 | A1 | 9/2001 |
| EP | 1133742 | A1 | 9/2001 |
| EP | 1145153 | A1 | 10/2001 |
| EP | 1145154 | A1 | 10/2001 |
| EP | 1163564 | A2 | 12/2001 |
| EP | 1193961 | A2 | 4/2002 |
| EP | 1227635 | A2 | 7/2002 |
| EP | 1248447 | A2 | 10/2002 |
| EP | 1290861 | A1 | 3/2003 |
| EP | 1292901 | A1 | 3/2003 |
| EP | 1292939 | A1 | 3/2003 |
| EP | 1328121 | A1 | 7/2003 |
| EP | 0873642 | B1 | 4/2004 |
| EP | 1413954 | A2 | 4/2004 |
| EP | 1107615 | B1 | 6/2004 |
| EP | 1033024 | A4 | 9/2004 |
| EP | 1129545 | A1 | 9/2004 |
| EP | 1061723 | B1 | 10/2004 |
| EP | 1455397 | A1 | 10/2004 |
| EP | 1469663 | A1 | 10/2004 |
| EP | 1484903 | A2 | 12/2004 |
| EP | 1566949 | A1 | 8/2005 |
| EP | 0985308 | B1 | 11/2005 |
| EP | 1359735 | B1 | 1/2006 |
| EP | 1357729 | B1 | 2/2006 |
| EP | 1377001 | B1 | 2/2006 |
| EP | 0954922 | B1 | 3/2006 |
| EP | 0986875 | B1 | 4/2006 |
| EP | 1410614 | B1 | 8/2006 |
| EP | 1774760 | A2 | 4/2007 |
| EP | 1021905 | B1 | 11/2007 |
| EP | 1031232 | B1 | 12/2007 |
| EP | 1865697 | A3 | 12/2007 |
| EP | 1040638 | B1 | 1/2008 |
| EP | 1046162 | B1 | 3/2008 |
| EP | 1157509 | B1 | 7/2008 |
| EP | 1337079 | B1 | 9/2008 |
| EP | 1326415 | B1 | 10/2008 |
| EP | 1333653 | B1 | 4/2009 |
| EP | 0983676 | B1 | 6/2009 |
| EP | 1125208 | B1 | 4/2010 |
| EP | 1142284 | B1 | 7/2010 |
| EP | 2380323 | A1 | 10/2011 |
| EP | 1408678 | B1 | 11/2011 |
| EP | 1057301 | B1 | 8/2013 |
| EP | 1131728 | B1 | 1/2014 |
| EP | 1625460 | B1 | 5/2014 |

(56) References Cited

FOREIGN PATENT DOCUMENTS

| | | | |
|---|---|---|---|
| ES | 2231120 | T3 | 5/2005 |
| ES | 2255657 | T3 | 7/2006 |
| ES | 2256666 | T3 | 7/2006 |
| ES | 2257639 | T3 | 8/2006 |
| FR | 2671252 | A1 | 7/1992 |
| GB | 2273225 | A | 6/1994 |
| GB | 2315190 | A | 1/1998 |
| GB | 2324627 | A | 10/1998 |
| GB | 2306853 | A | 5/1999 |
| GB | 2369263 | A | 5/2002 |
| JP | 61-51247 | | 3/1986 |
| JP | 62-200956 | | 9/1987 |
| JP | 63-149955 | | 6/1988 |
| JP | 64-7460 | | 3/1989 |
| JP | 64-77265 | | 3/1989 |
| JP | 02-170756 | | 7/1990 |
| JP | 02-298154 | | 12/1990 |
| JP | 03-052443 | | 3/1991 |
| JP | 03-160865 | | 7/1991 |
| JP | 03-177144 | | 8/1991 |
| JP | 04-40723 | | 2/1992 |
| JP | 4-66858 | | 6/1992 |
| JP | 04-265049 | | 9/1992 |
| JP | 4-336742 | | 11/1992 |
| JP | 04-371056 | | 12/1992 |
| JP | 06-044157 | | 2/1994 |
| JP | 06-046150 | | 2/1994 |
| JP | 06-066830 | | 3/1994 |
| JP | 06-069988 | | 3/1994 |
| JP | 06-83771 | | 3/1994 |
| JP | 06-90292 | | 3/1994 |
| JP | 06-103058 | | 4/1994 |
| JP | 06-121051 | | 4/1994 |
| JP | 06-284203 | | 7/1994 |
| JP | 06-261129 | | 9/1994 |
| JP | 06-291877 | | 10/1994 |
| JP | 06-334748 | | 12/1994 |
| JP | 07-046321 | | 2/1995 |
| JP | 07-058851 | | 3/1995 |
| JP | 07-115471 | | 5/1995 |
| JP | 07-170288 | | 7/1995 |
| JP | 07-170546 | | 7/1995 |
| JP | 07-262104 | | 10/1995 |
| JP | 07-212471 | | 11/1995 |
| JP | 07-319538 | | 12/1995 |
| JP | 07-336447 | | 12/1995 |
| JP | 08-46699 | | 2/1996 |
| JP | 08-056377 | | 2/1996 |
| JP | 08-163252 | | 6/1996 |
| JP | 08-181793 | | 7/1996 |
| JP | 08-504305 | | 7/1996 |
| JP | 08-214076 | | 8/1996 |
| JP | 08-214346 | | 8/1996 |
| JP | 08-510071 | | 10/1996 |
| JP | 8-321885 | | 12/1996 |
| JP | 8-329118 | | 12/1996 |
| JP | 8-331618 | | 12/1996 |
| JP | 09-036963 | | 2/1997 |
| JP | 09-501812 | | 2/1997 |
| JP | 09-504394 | | 4/1997 |
| JP | 09-149137 | | 6/1997 |
| JP | 09-163031 | | 6/1997 |
| JP | 09-224093 | | 8/1997 |
| JP | 09-508508 | | 8/1997 |
| JP | 09-233118 | | 9/1997 |
| JP | 09-265406 | | 10/1997 |
| JP | 10-11374 | | 1/1998 |
| JP | 10-13811 | | 1/1998 |
| JP | 10-51549 | | 2/1998 |
| JP | 10-093713 | | 4/1998 |
| JP | 10-093716 | | 4/1998 |
| JP | 10-504425 | | 4/1998 |
| JP | 10-116249 | | 5/1998 |
| JP | 10-143451 | | 5/1998 |
| JP | 10-506768 | | 6/1998 |
| JP | 10-214113 | | 8/1998 |
| JP | 10-224477 | | 8/1998 |
| JP | 10-509847 | | 9/1998 |
| JP | 10-304073 | | 11/1998 |
| JP | 10-304074 | | 11/1998 |
| JP | 10-327258 | | 12/1998 |
| JP | 10-513632 | | 12/1998 |
| JP | 11-055741 | | 2/1999 |
| JP | 11-506292 | | 6/1999 |
| JP | 11-183189 | | 7/1999 |
| JP | 11-508430 | | 7/1999 |
| JP | 11-508715 | | 7/1999 |
| JP | 11-317817 | | 11/1999 |
| JP | 11-512906 | | 11/1999 |
| JP | 11-346266 | | 12/1999 |
| JP | 2000-011005 | | 1/2000 |
| JP | 2000-49847 | | 2/2000 |
| JP | 2000-151819 | | 5/2000 |
| JP | 2000-514985 | | 11/2000 |
| JP | 2000-514986 | | 11/2000 |
| JP | 2000-516432 | | 12/2000 |
| JP | 2000-516795 | | 12/2000 |
| JP | 2000-517142 | | 12/2000 |
| JP | 2001-292236 | | 1/2001 |
| JP | 2001-500677 | | 1/2001 |
| JP | 2001-103533 | | 4/2001 |
| JP | 2001-516993 | | 10/2001 |
| JP | 2001-517027 | | 10/2001 |
| JP | 2001-517029 | | 10/2001 |
| JP | 2001-517038 | | 10/2001 |
| JP | 2001-518754 | | 10/2001 |
| JP | 2001-522201 | | 11/2001 |
| JP | 2001-523930 | | 11/2001 |
| JP | 3226929 | B2 | 11/2001 |
| JP | 2001-524782 | | 12/2001 |
| JP | 2001-526871 | | 12/2001 |
| JP | 2002-503903 | | 2/2002 |
| JP | 2002-503921 | | 2/2002 |
| JP | 2002-504783 | | 2/2002 |
| JP | 2002-518890 | | 6/2002 |
| JP | 2002-519762 | | 7/2002 |
| JP | 2002-525695 | | 8/2002 |
| JP | 2002-528824 | | 9/2002 |
| JP | 2002-529836 | | 9/2002 |
| JP | 2002-529943 | | 9/2002 |
| JP | 2002-529944 | | 9/2002 |
| JP | 2002-529945 | | 9/2002 |
| JP | 2002-529994 | | 9/2002 |
| JP | 2002-530010 | | 9/2002 |
| JP | 2002-534003 | | 10/2002 |
| JP | 2002-537594 | | 11/2002 |
| JP | 2003-502720 | | 1/2003 |
| JP | 2003-507908 | | 2/2003 |
| JP | 2003-510929 | | 3/2003 |
| JP | 3384792 | B2 | 3/2003 |
| JP | 3393119 | B2 | 4/2003 |
| JP | 2003-516672 | | 5/2003 |
| JP | 3453561 | B2 | 10/2003 |
| JP | 3461488 | B2 | 10/2003 |
| JP | 3516659 | B2 | 4/2004 |
| JP | 3547142 | B2 | 7/2004 |
| JP | 3547397 | B2 | 7/2004 |
| JP | 2004-312730 | | 11/2004 |
| JP | 2005-504452 | | 2/2005 |
| JP | 3615708 | B2 | 2/2005 |
| JP | 3628962 | B2 | 3/2005 |
| JP | 2005-094780 | | 4/2005 |
| JP | 2005-102234 | | 4/2005 |
| JP | 2005-124184 | | 5/2005 |
| JP | 3681403 | B2 | 8/2005 |
| JP | 3681406 | B2 | 8/2005 |
| JP | 3686087 | B2 | 8/2005 |
| JP | 3686337 | B2 | 8/2005 |
| JP | 3735124 | B2 | 1/2006 |
| JP | 3820151 | | 9/2006 |
| JP | 2006-295947 | | 10/2006 |
| JP | 3877523 | B2 | 2/2007 |
| JP | 4057785 | B2 | 3/2008 |
| JP | 4205310 | B2 | 1/2009 |

(56) References Cited

FOREIGN PATENT DOCUMENTS

| | | | |
|---|---|---|---|
| JP | 1013054 | B1 | 2/2009 |
| JP | 4234926 | B2 | 3/2009 |
| JP | 4295186 | B2 | 7/2009 |
| JP | 4450515 | B2 | 4/2010 |
| JP | 2012-513725 | | 6/2012 |
| KR | 10-2011-0098841 | A | 9/2001 |
| WO | 9208194 | A1 | 5/1992 |
| WO | 9401959 | A1 | 1/1994 |
| WO | 9429995 | A1 | 12/1994 |
| WO | 9508236 | A2 | 3/1995 |
| WO | 9520860 | A1 | 8/1995 |
| WO | 9533325 | A2 | 12/1995 |
| WO | 9620553 | A2 | 7/1996 |
| WO | 9623265 | A1 | 8/1996 |
| WO | 9627254 | A1 | 9/1996 |
| WO | 9701917 | A1 | 1/1997 |
| WO | 9712472 | A1 | 4/1997 |
| WO | 9713352 | A1 | 4/1997 |
| WO | 9716014 | A2 | 5/1997 |
| WO | 9718662 | A1 | 5/1997 |
| WO | 9720424 | A1 | 6/1997 |
| WO | 9722201 | A2 | 6/1997 |
| WO | 9723078 | A1 | 6/1997 |
| WO | 9726749 | A1 | 7/1997 |
| WO | 9728635 | A1 | 8/1997 |
| WO | 9729584 | A1 | 8/1997 |
| WO | 9734401 | A1 | 9/1997 |
| WO | 9736414 | A1 | 10/1997 |
| WO | 9737500 | A1 | 10/1997 |
| WO | 9738389 | A2 | 10/1997 |
| WO | 9738519 | A1 | 10/1997 |
| WO | 9750235 | A1 | 12/1997 |
| WO | 9801967 | A1 | 1/1998 |
| WO | 9810573 | A2 | 3/1998 |
| WO | 9813765 | A1 | 4/1998 |
| WO | 9813974 | A1 | 4/1998 |
| WO | 9817048 | A1 | 4/1998 |
| WO | 9814704 | A1 | 5/1998 |
| WO | 9827479 | A2 | 6/1998 |
| WO | 9831130 | A1 | 7/1998 |
| WO | 9835326 | A1 | 8/1998 |
| WO | 9835509 | A2 | 8/1998 |
| WO | 9836551 | A1 | 8/1998 |
| WO | 9837481 | A1 | 8/1998 |
| WO | 9837677 | A2 | 8/1998 |
| WO | 9837685 | A1 | 8/1998 |
| WO | 9837687 | A1 | 8/1998 |
| WO | 9844699 | A1 | 10/1998 |
| WO | 9844714 | A1 | 10/1998 |
| WO | 9848577 | A2 | 10/1998 |
| WO | 9854877 | A2 | 12/1998 |
| WO | 9856133 | A2 | 12/1998 |
| WO | 9856141 | A1 | 12/1998 |
| WO | 9857501 | A2 | 12/1998 |
| WO | 9900960 | A1 | 1/1999 |
| WO | 9900966 | A1 | 1/1999 |
| WO | 9903247 | A2 | 1/1999 |
| WO | 9912367 | A1 | 3/1999 |
| WO | 9913635 | A1 | 3/1999 |
| WO | 9914919 | A1 | 3/1999 |
| WO | 9914920 | A1 | 3/1999 |
| WO | 9914924 | A1 | 3/1999 |
| WO | 9914951 | A1 | 3/1999 |
| WO | 9917518 | A1 | 4/1999 |
| WO | 9923806 | A1 | 5/1999 |
| WO | 9923807 | A1 | 5/1999 |
| WO | 9926395 | A1 | 5/1999 |
| WO | 9926424 | A2 | 5/1999 |
| WO | 9927696 | A1 | 6/1999 |
| WO | 9834390 | A1 | 8/1999 |
| WO | 9941720 | A1 | 8/1999 |
| WO | 9941890 | A2 | 8/1999 |
| WO | 9941891 | A1 | 8/1999 |
| WO | 9941895 | A1 | 8/1999 |
| WO | 9943137 | A1 | 8/1999 |
| WO | 9925117 | | 10/1999 |
| WO | 9956229 | A1 | 11/1999 |
| WO | 9958227 | A1 | 11/1999 |
| WO | 9965214 | A1 | 12/1999 |
| WO | 9965252 | A2 | 12/1999 |
| WO | 9967718 | A1 | 12/1999 |
| WO | 0007332 | A2 | 2/2000 |
| WO | 0016207 | A1 | 3/2000 |
| WO | 0016523 | A1 | 3/2000 |
| WO | 0018094 | A1 | 3/2000 |
| WO | 0016203 | A1 | 5/2000 |
| WO | 0025238 | A1 | 5/2000 |
| WO | 0026804 | A1 | 5/2000 |
| WO | 0026816 | A1 | 5/2000 |
| WO | 0026817 | A1 | 5/2000 |
| WO | 0027053 | A2 | 5/2000 |
| WO | 0028425 | A1 | 5/2000 |
| WO | 0028702 | A1 | 5/2000 |
| WO | 0035173 | A1 | 5/2000 |
| WO | 0038398 | A1 | 6/2000 |
| WO | 0044159 | A1 | 7/2000 |
| WO | 0049482 | A2 | 8/2000 |
| WO | 0049778 | A1 | 8/2000 |
| WO | 0113606 | A1 | 2/2001 |
| WO | 0124025 | A1 | 4/2001 |
| WO | 0140997 | A1 | 6/2001 |
| WO | 0141372 | A1 | 6/2001 |
| WO | 0143410 | A1 | 6/2001 |
| WO | 0152513 | A1 | 7/2001 |
| WO | 0180214 | A1 | 10/2001 |
| WO | 0180540 | A1 | 10/2001 |
| WO | 0184360 | A1 | 11/2001 |
| WO | 02065741 | A2 | 8/2002 |
| WO | 03010948 | A1 | 2/2003 |
| WO | 3516656 | B2 | 4/2004 |
| WO | 2004063854 | A2 | 7/2004 |
| WO | 2005036907 | A1 | 4/2005 |
| WO | 2006055059 | A2 | 5/2006 |
| WO | 2010075151 | A1 | 7/2010 |

OTHER PUBLICATIONS

"Guide for the Use of Micro-Researcher II/SGR (Scroll Graph Section)," NEC Corporation, Third Edition, Chapters 1 & 5, Jul. 1995, 2 pages.

"Kana: Customer Messaging System," Kana Communications Sales Brochure, Palo Alto, CA, 1996, 12 pages.

"Latest Trend in CTI," Nikkei Communications, No. 248, Jun. 15, 1997, 14 pages.

"Method for Automatic Contextual Transposition Upon Receipt of Specified Criteria," IBM Technical Disclosure Bulletin, vol. 37, No. 2B, Feb. 1994, 1 page.

"New Telephone Service Changing Computer Telephone Business," Nikkei Communications, Nov. 11, 1996, 7 pages.

"Single Line Suffices for Internet Telephone," Nikkei Communications, May 19, 1997, 9 pages.

Bachmann, David W. et al., "NetMod: A Design Tool for Large-Scale Heterogeneous Campus Networks," Center for Information Technology Intergration (CITI), The University of Michigan, Ann Arbor, MI, Jun. 15, 1990, 34 pages.

Bangun, H. et al., A Network Architecture for Multiuser Networked Games on Demand, International Conference on Information Communications and Signal Processing, ICICS '97, Sep. 9-12, 1997, 5 pages.

Bertsekas, Dimitri et al., "Data Networks," Prentice-Hall, New Jersey, 1997, 5 pages.

Chan, Kevin F. et al., "Interactive Network Planning and Analysis on a Personal Computer," Computer Applications in Power, IEEE, vol. 3, No. 1, Jan. 1990, 5 pages.

Chau, Sam et al., "Intelligent Network Routing Using CCS7 and ISDN," Global Telecommunications Conference, vol. 3, 6 pages, 1990.

Chaudhuri, Surajit et al., "Optimizing Queries over Multimedia Repositories," Hewlett-Packard Laboratories Stanford, Mar. 1996, 12 pages.

(56) References Cited

OTHER PUBLICATIONS

Chaum, David, "Untraceable Electronic Mail, Return Addresses, and Digital Pseudonyms," Communications of the ACM, vol. 24, No. 2, Feb. 1981, 8 pages.
Chew, T.-S. et al., "NETPLAN-a Telecommunications Network Planning Support System," TENCON '92 IEEE Region 10 International Conference, vol. 2, 7 pages, 1992.
Chiu, H. et al., "Conferencing Metaphor," IBM Technical Disclosure Bulletin, vol. 36, No. 2, Feb. 1993, 4 pages.
Cordom, Christopher et al., "Conversant VIS Listens and Talks to Your Customers," AT&T Technology, vol. 9, No. 2, 4 pages, 1994.
D'Hooge, Herman, "The Communicating PC," IEEE Communications Magazine, 6 pages, Apr. 1996.
Durinovic-Johri, Sanja et al., "Advanced Routing Solutions for Toll-Free Customers Algorithm Design and Performance," Proceedings of the International Teletraffic Congress, ITC-15, 1997, 12 pages.
Festa, Paul, "Vignette Updates StoryServer Platform," CNET News.com, Sep. 16, 1997, 4 pages.
Foster, Rosin Harris, "Advanced Definity Call Centers Worldngfor You and Your Customers," AT&T Technology, vol. 9, No. 2, 1994, 6 pages.
Francis, Paul et al., "Flexible Routing and Addressing for a Next Generation IP,"SIGCOMM, 10 pages, 1994.
Gawrys, G.W., et al., "ISDN Integrated Network/Premises Solutions for Customer Needs," ICC, 6 pages, 1986.
Gechter, J. et al., "ISDN Service Opportunities in the Intelligent Network," Proceedings of the National Communications Forum, Chicago, IL, vol. 43, No. 1, Oct. 1989, 4 pages.
Harvey, Dean E. et al., "Call Center Solutions," AT&T Technical Journal, vol. 70, No. 5, 10 pages, Sep./Oct. 1991.
Hofmann, Peter, et al., "@INGate Integrating Telephony and Internet," IEEE Conference on Protocols for Multimedia Systems, 4 pages, Nov. 1997.
House, Eric, "How to Munge Outgoing From: Field When Using Mail?," Google Discussion Group, Apr. 2, 1997, 1 page.
Hu, Michael Junke et al., "An Object-Relational Database System for the Interactive Multimedia," IEEE International Conference on Intelligent Processing Systems, pp. 1571-1575, Oct. 1997.
International Search Report for PCT/US96/16919, dated Jun. 2, 1997, 3 pages.
International Search Report for PCT/US97/01469, dated Apr. 14, 1997, 1 page.
International Search Report for PCT/US97/05457, dated Jun. 24, 1997, 2 pages.
International Search Report for PCT/US97/11881, dated Oct. 24, 1997, 1 page.
Katz, Michael, "When CTI Meets the Internet," Telecommunications, vol. 31, No. 7, Jul. 1997, 6 pages.
Kaufman, Harvey, "Call Centers in Cyberspace," Communications News, vol. 34, Issue 7, Jul. 1997, 4 pages.
Kramer, Brian, "How to Send aFile to the Sender of a Message?," Google Discussion Group, May 27, 1994, 5 pages.
Lee, Chien-I, et al., "A New Storage and Retrieval Method to Support Editing Operations in a Multi-disk-based Video Server," Fourth International Conference on Parallel and Distributed Information Systems, IEEE, Miami Beach, FL, Dec. 1996, 10 pages.
Lin, Yi-Bing et al., "A Felxible Graphical User Interface for Performance Modeling," Software—Practice and Experience, vol. 25(2), Feb. 1995, 24 pages.
Low, Colin, "The Internet Telephony Red Herring," Global Telecommunications Conference, Nov. 1996, 15 pages.
Mackay, Wendy E., et al., "Virtual Video Editing Interactive Multimedia Applications," Communications of the ACM, vol. 32, No. 7, Jul. 1989, 9 pages.
Masashi, Tsuboi et al., "Computer Telephony Integration System," CTSTAGE, Oki Electric Research and Development, 174, vol. 64, No. 2, Apr. 1, 1997, 10 pages.
Matsuo, Yasunori, "Microsoft Project for Windows 95," Nikkei Personal Computing Nikkei Business Publications Inc., No. 255, Dec. 18, 1995, 2 pages.
Mattison, Rob, "Data Warehousing and Data Mining for Telecomunications," Artech House, Boston, 1997, 7 pages.
Microsoft Dictionary Pages, Microsoft Press, Redmond, WA, 1991, 2 pages.
Newton, Harry "Newton's Telecom Dictionary," Flatron Publishing, New York, 1994, 7 pages.
Padmanabhan, M., et al. Speech Recognition Performance on a Voicemail Transcription Task, IBM T.J. Watson Research Center, Yorktown Heights, NY, 4 pages.
Rangan, P. Venkat, et al., "A Window-Based Editor for Digital Video and Audio," Proceedings of the 25th Hawaii International Conference on System Sciences, IEEE, vol. 2, Jan. 1992, 9 pages.
Recker, Mimi M. et al., "Predicting Document Accessin Large, Multimedia Repositories," ACM Transactions on Computer-Human Interaction, vol. 3, 1994, 23 pages.
Schmandt, Chris, "Phoneshell: the Telephone as Computer Terminal," Proceedings of ACM Multimedia Conference, 1993, 10 pages.
Sevick, Peter et al., "The Call Center Revolution," Northeast Consulting Technical Paper, Jan. 1, 1997, 12 pages.
Smith, J.D., An Overview to Computer-Telecommunications Integration (CTI), Telecommunications, Conference Publication No. 404, IEEE, Mar. 26-29, 1995, 5 pages.
Sulkin, Allan, Building the ACD-LAN Connection, Business Communications Review, Jun. 1996, 4 pages.
Szlam, Aleksander et al., "Predictive Dialing Fundamentals," Flatron Publishing, New York, 1996, 28 pages.
Tadamura, Katsumi et al., "Synchronizing Computer Graphics Animation and Audio," IEEE, 1998, 11 pages.
Toji, Ryutaro et al., "A Study of Customer Contact Operation System and Functions," Proceedings of the IECE General Conference, Comm. 2, Mar. 6, 1997, 3 pages.
Tsunemasa, Mizuo, "CTI World 2: World of CTI," Business Communication, vol. 34, No. 2, Feb. 1, 1997, 13 pages.
Van Zijl, Lynette, et al., "A Tool for Graphical Network Modeling and Analysis," IEEE Software, Jan. 1992, 8 pages.
Vasquez, E., et al., Graphical Interface for Communications Network Analysis and Simultion, Department of Telematice Engineering, Technical University of Madrid, IEE, 1991, Spain, 4 pages.
Zenel, Bruce et al., Intelligent Communication Filtering for Limited Bandwith Environments, Computer Science Department, Columbia University, IEEE, 1995, 7 pages.

* cited by examiner

IN-BAND SIGNALING FOR ROUTING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED DOCUMENTS

The present application is a *reissue patent application of U.S. Pat. No. 6,470,080 filed on, Jul. 27, 2000. Application Ser. No. 09/626,779 is a* divisional application of application Ser. No. 08/972,772 filed Nov. 18, 1997, now U.S. Pat. No. 6,104,802 [which is a Continuation-In-Part (CIP) of application Ser. No. 08/879,619, filed Jun. 20, 1997, which is a CIP of Ser. No. 08/802,660 filed Feb. 19, 1997 now U.S. Pat. No. 5,946,387, which is a CIP of Ser. No. 08/797,407 filed Feb. 10, 1997, all of which are incorporated herein in their entirety by reference].

FIELD OF THE INVENTION

The present invention is in the field of computer telephony and has particular application to intelligent network call routing.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994.

At the time of filing the present patent application there continues to be remarkable growth in telephone-based information systems, which are intelligent networks. Recently emerging examples are telemarketing operations and technical support operations, among many others, which have grown apace with development and marketing of, for example, sophisticated computer equipment. More traditional are systems for serving customers of such as large insurance organizations. In some cases organizations develop and maintain their own telephony operations with purchased or leased equipment, and in many other cases, companies are outsourcing such operations to firms that specialize in such services.

In telephony art, much commercial development is in the area of what are known as call center services and systems, wherein an organization maintains one or more call centers manned by agents of the organization to provide services to clients of the organization. The call centers are typically based on a telephony switch such as a PBX, having incoming trunks and station-side ports connected to agent stations having a least a telephone. Incoming calls are routed to agents based in any of many possible routing criteria. In relatively more state-of-the-art call centers the switches are computer enhanced by being connected to processors running applications for providing additional services not provided by the switch alone. In the art the processes of such enhancement are known as computer telephony integration (CTI). It is to such systems that embodiments of the present invention are principally (but not exclusively) directed. Embodiments will in general be described relative to call centers.

In an intelligent telephony network such as described herein, incoming calls placed from anywhere in the Public Switch Telephone Network (PSTN) are typically routed by computerized systems known in the art as Service Control Points (SCPs.

Additional processors and software may be provided associated with an SCP for further computer enhancement. For example, when a call arrives at a control point, information about the caller may be collected and processed to help determine the final destination of the call. Then according to programmed routing rules, the call may be switched to a call center and then on to an available agent. In many intelligent networks known to the inventor, digital information pertaining to the caller may be sent ahead to a call center by means of a data link separate from the call carrier, the data link implemented between the SCP and the call center, typically through a CTI processor connected to the telephony switch at the call center. Routing in an intelligent network may be accomplished on several levels according to many different protocols.

A problem with routing within a conventional network is that the final destination for a call is often determined before the call leaves the SCP and further routing is largely automated at decentralized telephony switches within the network. This increases the possibility of errors in routing. Calls may be incorrectly routed in the first instance, and, since call transfer is a process that takes a certain length of time, there may be changes while a call is routed, so when the call arrives at the destination, the situation may have changed to the point that the cal will have too be re-routed. Further, the information at an SCP for use in determining routing of calls is typically information updated periodically, and not real-time data.

Another recent development in telephony art is what is known as Internet Protocol Network Telephony (IPNT), wherein conventional telephone calls are simulated between computers over the data network known as the Internet, using microphones and speakers operating with the computers and a graphical user interface operable on each connected computer. Several commercial vendors offer software for simulating such telephony, and similar systems may operate with data networks other than the Internet, such as through company Intranets. At the time of the present patent application such data networks are considered largely "dumb" networks rather than intelligent networks, although some routing is done. Calls are routed in the Internet, for example, by IP addresses, and IP switches and hubs are capable of altering the destination of data packets by controlling IP addresses. In embodiments of the invention that follow, although intelligent telephony networks are used in the main for examples of practicing the invention, the features of the invention are meant to apply as well to IPNT.

What is clearly needed is a better system and method to do call routing whereby determination for routing calls can be shared with decentralized routers in the field without using a separate digital network for transmitting data. In such a system determination of final routing can be made as close as possible to final destination, and information used for routing can be maintained in much closer to real time.

SUMMARY OF THE INVENTION

In a preferred embodiment of the present invention a method for routing a telephone call in a network is provided, comprising steps of (a) attaining, at a first network destination point, routing data associated with the call other than origination identification or first destination identification; (b) forwarding the routing data in-band with the call to a second network point, (c) accessing the routing data at the second network point; and; (d) using the routing data to select a third network destination for the call. In some embodiments of the method the network is an intelligent telephony network routing telephone calls, and the first destination point is a service control point (SCP). In these embodiments the routing data other than origination identification or first destination identification may be data elicited from a caller. In some embodiments as well, the data is overwritten by a first router at the first network point into one or more data fields conventionally dedicated to information other than the routing data. In such embodiments, in steps (c) and (d) the accessing and using is by a second router at the second network point, and the first router and the second router may negotiate routing path.

In other embodiments the network is a wide area data network, and the telephone calls are simulated calls between two or more computer stations connected to the wide area data network. In the case of call simulation in a wide area network, at the first network destination point a first router writes routing data into one or more data fields in a data packet associated with the call, and forwards the data packet to a second destination point for further routing by a second router using the routing data.

In another aspect of the invention a routing system for telephone calls in a network comprising a first router associated with a first network destination point; and a second router associated with a second network destination point. For a call received at the first network destination point, the first router writes routing data other than call origination identification or first destination identification into one or more data fields conventionally dedicated to other than the routing data, and the second router at the second network destination point uses the routing data from the one or more data fields to further route the call. In systems of the invention the network may be an intelligent telephony network with the first destination point a service control point (SCP) and the second network destination point a computer-telephony integrated (CTI) telephony switch at a call center. In such an embodiment the first router and the second router negotiate based on the data written by the first router into the one or more data fields.

In an alternative aspect of the invention the network may be a wide area data network, and the telephone calls are calls between two or more computer stations connected to the wide area data network rather than between telephones, the computers providing telephone functions. The wide area data network may the Internet, wherein the calls are Internet Protocol Network Telephony calls, or may be an Intranet.

A distinct advantage of the present invention is that no separate data network is necessary in an intelligent telephony network for the purpose of delivering routing data to a second (or further) destination point. Such data arrives with the call or with a data packet associated with the call. Negotiation is still possible, and there is little difficulty in associating the data with an arriving call.

BRIEF DESCRIPTION OF THE DRAWING FIGURES

DESCRIPTION OF THE PREFERRED EMBODIMENTS

Figure 1:
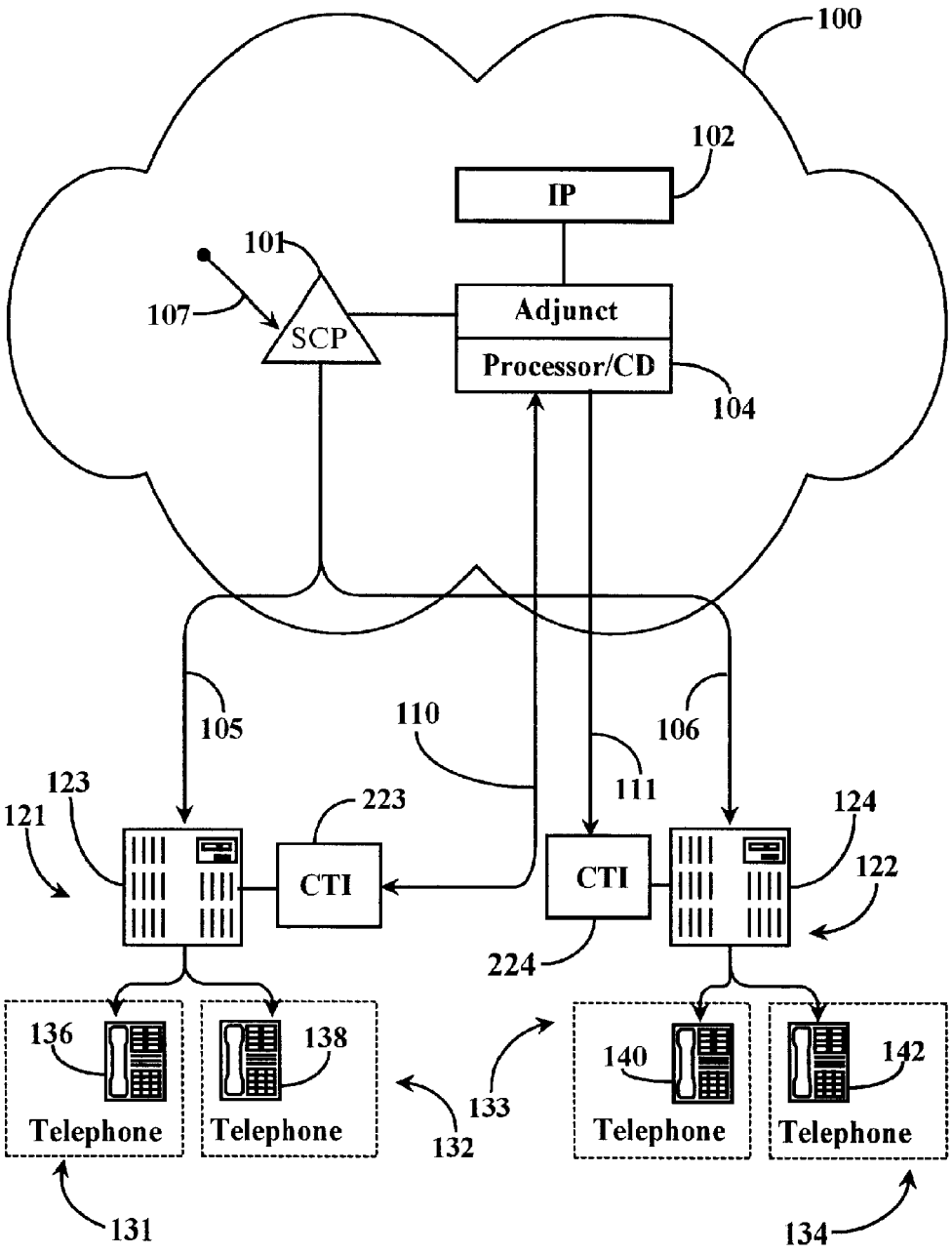
FIG. 1 is a simplified overview of an intelligent network as known to the inventor before the present invention, but not in the public domain.

FIG. 1 is a simplified overview of an intelligent network known to the present inventor wherein incoming calls are represented by a vector 107 arriving at a Service Control Point (SCP) 101 in Network cloud 100. Network cloud 100 may be a Publicly Switched Telephony Network (PSTN), a private network, or any other wide area network (WAN) of telephones and connected equipment.

An adjunct processor 104 in this instance is associated with the SCP, and is provided for the purpose of computer enhancement. Adjunct processor 104 may contain or be connected to other applications known in the art such as a call distributor (CD) and an intelligent peripheral (IP) 102. IP 102 typically provides enhanced capability related to obtaining caller information such as by interactive voice response (IVR) techniques and so on. There may also be additional capabilities attributed to adjunct processor 104 such as an instance of a routing application or an instance of a stat-server, which is a server that stores updated statistical information and provides such information for routing purposes.

When a call 107 arrives at SCP 101, information is typically elicited from the caller using the capabilities of LP 102. This information and information stored in the stat-server, comprising such as agent availability and load statistics, is used to determine routing for call 107. In prior art intelligent networks, routing is typically predetermined before call 107 leaves SCP 101.

Two call centers 121 and 122 are shown in FIG. 1. It will be apparent to those with skill in the art that there may be many more than two such call centers, but two is considered adequate to describe the prior art in the present case. When routing is determined at SCP 101, the incoming call may be switched to either of centers 121 or 122. In the instance shown in FIG. 1, call centers 121 and 122 are computer-enhanced. A computer telephony integration (CTI) processor 223 is connected to switch 123 at center 121 and a CTI processor 224 is connected to switch 124 at center 122. A bi-directional data link 110 connects processor 223 to adjunct processor 104 and a bi-directional data link 111 connects processor 224 to adjunct processor 104.

When routing is determined at SCP 101 to one of call centers 121 and 122, information solicited from a caller may be forwarded via the appropriate data link, 110 or 111, to the call center, where the data may be used for purposes such as a key to retrieve information from a data base to aid an agent in serving the caller.

Call center 121 comprises two agent stations, agent station 131 and agent station 132. Similarly call center 122 comprises two agent stations, agent station 133 and agent station 134. Agent stations 131 through 134 are equipped with telephones 136, 138, 140, and 142 respectively. In some embodiments, agent stations such as described above may have computer platforms connected to video display units (PC/VDUs), not shown in FIG. 1. It will be apparent to one with skill in the art that there may be many more agent stations and telephones. Call 107 is forwarded over lines 105 or 106 to the appropriate call center, depending upon routing determined at the SCP. Upon reaching the call center, call 107 is then distributed to an available agent at one of telephones 136, 138, 140, or 142, via programmed routing executed from either processor 223 or processor 224.

Figure 2:
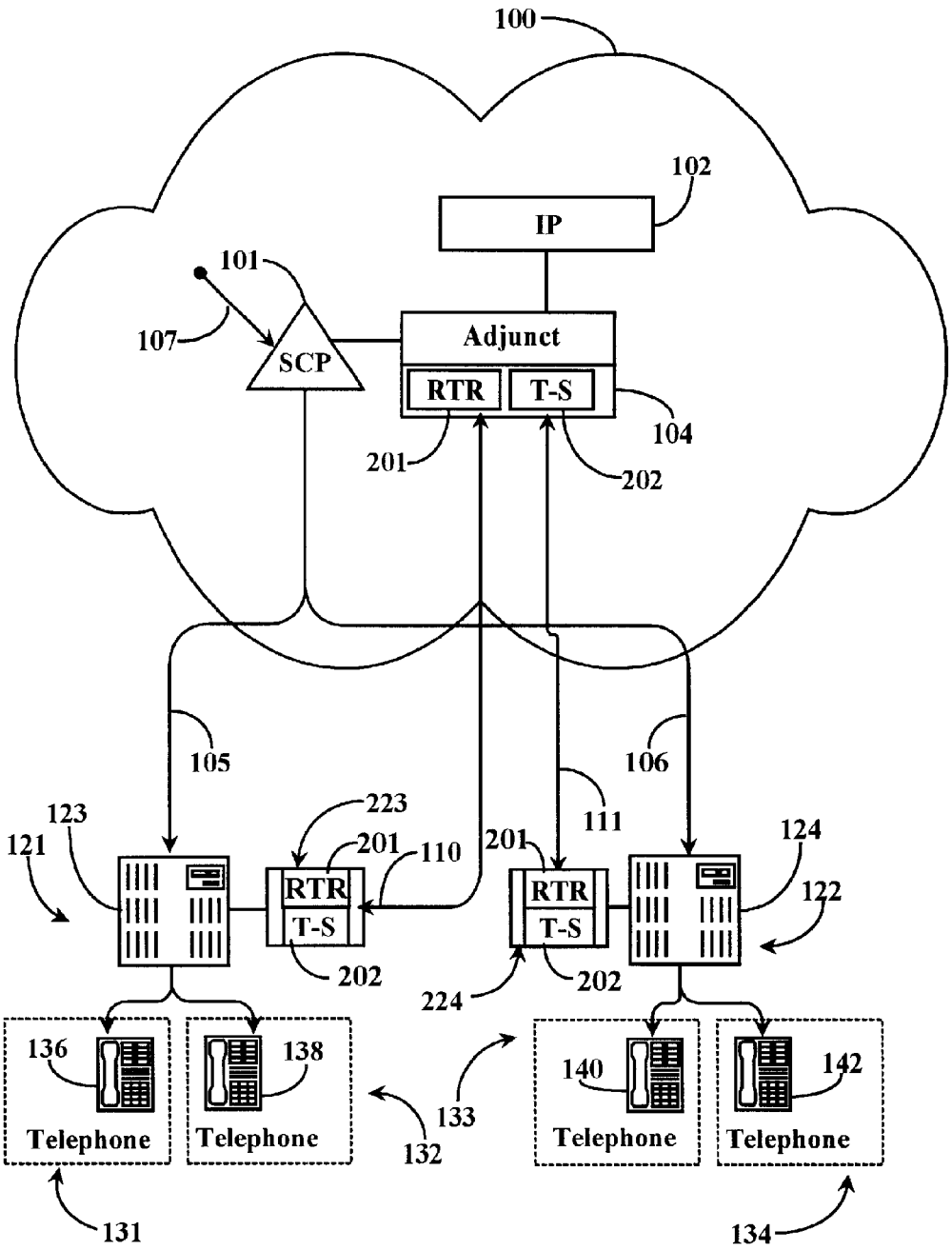
FIG. 2 is a simplified overview of an intelligent network using an inband signaling technique according to an embodiment of the present invention.

FIG. 2 is a simplified overview of a system according to an embodiment of the present invention wherein a method of in-band signaling is uniquely applied to provide intelligent routing with routing decisions made closer to final call destination, and affording some level of negotiated routing. The system represented by FIG. 2 contains many of the components described above for the system of FIG. 1. Repetition of element introduction is not repeated for FIG. 2.

A typical means of routing calls is by use of the calling party's number and/or the destination number. It is known in the art to transfer such information when forwarding a call, by means of what is known as Automatic Number Information (ANI number) and Destination Number Identification System (DNIS). Depending on the nature of the equipment used, the network itself, and software, the actual mechanisms for providing these numbers may vary. For example, with older analog telephone equipment and lines, a call is sent to a receiving point by coded voltage difference between a pair of wires. In this case, a wink and blink system is used to establish contact, then ANI and/or DNIS numbers may be provided coded as a header to the call before analog audio signals are established.

As another example, using later digital equipment and controlling software, a data packet having data fields dedicated to ANI and/or DNIS may precede a call, making this information available to a receiving station. . Data fields are more recognizable in the digital example, but the preceding coded information sent with an analog call may also be considered to be sent in a dedicated field. The nomenclature of a dedicated data field is used herein to include analog calls as well as digital calls.

In either case, analog or digital, the ANI number and DN1S number may be considered "in-band" information. That is, the information accompanies (or precedes) the telephone call, and is transmitted on the same communication link as the telephone call. In the case of IPNT calls, over, for example, the Internet, information is sent by data packets, including fields for various purposes, such as an IP address, in addition to digital audio data. This data may be considered as in-band data as well, and the in-band fields are dedicated fields for a particular purpose. Also, in each case, the protocols and methods by which the in-band information is transmitted are well-known in the art.

In embodiments of the invention described below, available in-band data fields are adapted to carry routing information associated with a telephone call for purposes of routing calls and negotiating routing with routers located at various levels in a network.

Referring now to FIG. 2, a router application 201 and an instance of a CTI application 202 known to the inventors as T-server execute at adjunct processor 104 in the network cloud. Router application 201 uses information typically elicited from callers or retrieved from a database associated with a call, and uses that information along with possibly additional information available to generate routing for calls according to routing protocol in the network. It will be apparent to one with skill in the art that applications such as router application 201 and T-server application 202 may reside in a single processor, or more than one processor that is associated with SCP 101 without departing from the spirit and scope of the present invention. Separation of these applications and processors is done here for illustrative purposes only.

In a preferred embodiment of the present invention CTI processor 223 executes instances of router application 201 as well as T-server application 202. Similarly, CTI processor 224 executes an instance of router application 201 and T-server application 202. Using this particular configuration of a central router and decentralized routers, in-band signaling is practiced between the routers in various embodiments of the invention to provide intelligent interaction between the routers. Existing data fields are used to forward routing information other than ANI and DNIS numbers by manipulating existing in-band signal fields. Such dedicated fields are completely or partially overwritten with routing data, and this information is then transmitted in-band over telephony lines 105 and 106 as described above.

As just one of many possible examples, if it is determined that call 107 is to go to an agent that speaks Spanish and is trained to provide technical assistance with a particular product, then router application 201 at the network level would, in an embodiment of the invention, overwrite a portion of an in-band signal field with this information. It will be apparent to those with skill in the art that this data set is but one of very many that might be extant in different situations for different organizations.

There are a number of existing fields in telephony that may be utilized. For example, in the AT&T™ network there is a Customer Data Field (CDPD) provided by the carrier at the SCP and then delivered and used by a G3-type switch. This field may be used to provide in the telephone call a key or actual data, or a combination of the two. In other networks, such as MCI for example, there are similar fields whose conventional use may be co-opted for routing purposes. The Destination Number Information Service (DNIS) field may be similarly over written with routing data.

Router application 201 has the ability to configure and execute routing data overwrites to different fields generic to different switches and or networks such as AT&T, MCI, Rockwell, Lucent or Northern Telecom, and so on. The manipulated in-band signal then carries the routing data over, for example, conventional telephony line 105 to telephony switch 123 where an instance of router application 201 residing in CTI processor 223 can read the information and use it to route call 107 to an agent connected to a station-side port at the call center. By utilizing in-band signaling for routing, in some instances network connections 110 and 111 can be eliminated. All routing in such embodiments can be provided in the form of in-band signaling from the network to routers at lower levels There are some possible problems which have occurred to the inventor. For example, it is inevitable that there may be some mistakes on occasion in initial routing of calls with in-band data. A problem may arise because in-band signaling for routing purposes may seem at first glance to be single-directional, from the higher-level router to the lower. In various embodiments of the invention, however, a level of negotiation may yet be provided between the higher-level router and the lower. For example, in one embodiment, software may be provided associated with both sending and receiving routers such that if the receiving router is not prepared to handle a particular call by the nature of the in-band routing data, the receiving router may cause the receiving equipment to respond to the call with a busy signal. The busy signal may be interpreted by the sending router as a return signal that the call is refused, and should be routed to an alternative destination. Similarly a number-of-rings (time) protocol could accomplish similar negotiation.

In some embodiments using ISDN lines in place of conventional telephony lines, additional communication between instances of router application 201 in bi-directional fashion is possible, as a return signal may be sent over one of the ISDN channels.

It will be apparent to those with skill in the art that an intelligent network such as the one described with reference to FIG. 2 wherein in-band signaling is manipulated to provide routing instruction may be implemented in a wide variety of architectures without departing from the spirit and scope of the present invention. For example, such an intelligent network scheme may comprise many call-centers and CTI-enhanced telephony switches, may or may not employ a separate network for data communication between routing points in the network, and may use different types of telephony lines or trunks.

In the matter of IPNT, it should be apparent that an Internet call, for example, may be directed to a first destination, which may be adapted to communicate with and elicit information from a caller, and also in some instances to retrieve additional information from stored resources. Routing intelligence at the first destination may then encode all or part of such information in one or more data fields of data packets and direct the data packets to a second destination, wherein the encoded in-band data may be used to further route the call. Negotiation may be accomplished between the first and the second routers resulting in further routing determination, and there is no real limit to the number of iterations that may be performed. Thusly, as in an intelligent network as described above, routing may be forced to levels closer and closer to -final destinations, where decisions may be made on information more apt to be closer to real-time.

It will also be apparent to those with skill in the art that the method of the present invention wherein in-band signaling is used may be adapted to differing types of telephony switches without departing from the spirit and scope of the present invention. It is well known that the functions of telephony switches offered by different manufacturers may vary. However, the in-band signaling properties available with these switches are similar so that a router could be adapted to overwrite the data fields therein. A routing application may be programmed to enable the overwrite of in-band signal fields of several different switches that may be employed on the same network. There are many such possibilities many of which have already been described. The spirit and scope of the present invention is limited only by the claims that follow.

What is claimed is:

1. A method for routing a telephone call in a network comprising steps of:

(a) attaining, at a first network destination point, routing data associated with the call other than origination identification or first destination identification;

(b) forwarding the routing data in-band with the call to a second network point;

(c) accessing the routing data at the second network point; and;

(d) using the routing data to select a third network destination for the call.

2. The method of claim 1 wherein the network is an intelligent telephony network routing telephone calls, and the first destination point is a service control point (SCP).

3. The method of claim 2 wherein, in step (a) the routing data other than origination identification or first destination identification is data elicited from a caller.

4. The method of claim 2 wherein, in step (b) the data is overwritten by a first router at the first network point into one or more data fields conventionally dedicated to information other than the routing data.

5. The method of claim 4 wherein, in steps (c) and (d) the accessing and using is by a second router at the second network point, and wherein the first router and the second router negotiate a routing path.

6. The method of claim 1 wherein the network is a wide area data network, and the telephone calls are simulated calls between two or more computer stations connected to the wide area data network.

7. The method of claim 6 wherein at the first network destination point a first router writes routing data into one or more data fields in a data packet associated with the call, and forwards the data packet to a second destination point for further routing by a second router using the routing data.

8. A routing system for telephone calls in a network comprising:

a first router associated with a first network destination point; and a second router associated with a second network destination point;

wherein, for a call received at the first network destination point, the first router writes routing data other than call origination identification or first destination identification into one or more data fields conventionally dedicated to other than the routing data, and the second router at the second network destination point uses the routing data from the one or more data fields to further route the call,

*wherein the network is an intelligent telephony network, the first destination point is a service control point (SCP) and the second network destination point is a computer-telephony integrated (CTI) telephony switch at a call center, and*

*wherein the first router and the second router negotiate based on the data written by the first router into the one or more data fields.*

[9. The system of claim 8 wherein the network is an intelligent telephony network, the first destination point is a service control point (SCP) and the second network destination point is a computer-telephony integrated (CTI) telephony switch at a call center.]

[10. The system of claim 9 wherein the first router and the second router negotiate based on the data written by the first router into the one or more data fields.]

11. [The system of claim 8] *A routing system for telephone calls in a network comprising:*

*a first router associated with a first network destination point; and*

*a second router associated with a second network destination point;*

*wherein, for a call received at the first network destination point, the first router writes routing data other than call origination identification or first destination identification into one or more data fields conventionally dedicated to other than the routing data, and the second router at the second network destination point uses the routing data from the one or more data fields to further route the call,* wherein the network is a wide area data network, and the telephone calls are calls between two or more computer stations connected to the wide area data network rather than between telephones, the computers providing telephone functions.

12. The system of claim 11 wherein the wide area data network is the Internet, and wherein the calls are Internet Protocol Network Telephony calls.

* * * * *